(12) United States Patent
Bargatin et al.

(10) Patent No.: US 7,552,645 B2
(45) Date of Patent: Jun. 30, 2009

(54) DETECTION OF RESONATOR MOTION USING PIEZORESISTIVE SIGNAL DOWNMIXING

(75) Inventors: Igor Bargatin, Pasadena, CA (US); Edward B. Myers, Sherman Oaks, CA (US); Mo Li, Pasadena, CA (US); Jessica Arlett, South Pasadena, CA (US); Benjamin Gudlewski, Pasadena, CA (US); Michael L. Roukes, Pasadena, CA (US); Darron K. Young, South Pasadena, CA (US); Hong X. Tang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/590,485

(22) PCT Filed: Feb. 24, 2005
(Under 37 CFR 1.47)

(86) PCT No.: PCT/US2005/005597
§ 371 (c)(1),
(2), (4) Date: Apr. 2, 2008

(87) PCT Pub. No.: WO2005/081929
PCT Pub. Date: Sep. 9, 2005

(65) Prior Publication Data
US 2008/0216583 A1    Sep. 11, 2008

Related U.S. Application Data

(63) Continuation-in-part of application No. 11/010,578, filed on Dec. 14, 2004, now Pat. No. 7,434,476.

(60) Provisional application No. 60/547,168, filed on Feb. 25, 2004, provisional application No. 60/562,652, filed on Apr. 15, 2004.

(51) Int. Cl.
G01B 7/16 (2006.01)
(52) U.S. Cl. .................. 73/777; 73/104; 73/105
(58) Field of Classification Search .................. 73/105, 73/777
See application file for complete search history.

(56) References Cited

U.S. PATENT DOCUMENTS 3,034,345 A    5/1962  Mason (Continued)

FOREIGN PATENT DOCUMENTS

WO    WO 03/095616 A2    11/2003

(Continued)

OTHER PUBLICATIONS

Harley et al., "High-Sensitivity Piezoresistive Cantilevers Under 1000 A Thick," Physics Letters, vol. 75, No. 2, American Institute of Physics, Jul. 12, 1999, pp. 289-291.

(Continued)

*Primary Examiner*—Max Noori
(74) *Attorney, Agent, or Firm*—Foley & Lardner LLP

(57) ABSTRACT

A system containing a micro-mechanical or nano-mechanical device and a method of operating the same is provided. The device includes a resonator and a piezoresistive element connected to the resonator. The method includes AC biasing the piezoresistive element at a first frequency, driving the resonator at a second frequency different from the first frequency, and detecting a mechanical response of the resonator at one or both of a difference frequency and a sum frequency of the first and second frequencies.

61 Claims, 16 Drawing Sheets

U.S. PATENT DOCUMENTS

| | | | |
|---|---|---|---|
| 4,798,206 | A | 1/1989 | Maddison et al. |
| 5,266,801 | A | 11/1993 | Elings et al. |
| 5,345,816 | A * | 9/1994 | Clabes et al. ............... 438/52 |
| 5,475,318 | A | 12/1995 | Marcus et al. |
| 5,619,139 | A * | 4/1997 | Holczer et al. ............. 324/318 |
| 5,804,709 | A | 9/1998 | Bourgoin et al. |
| 5,839,062 | A | 11/1998 | Nguyen et al. |
| 6,006,606 | A | 12/1999 | Shinogi et al. |
| 6,075,585 | A | 6/2000 | Minne et al. |
| 6,185,991 | B1 | 2/2001 | Hong et al. |
| 6,784,074 | B2 | 8/2004 | Shchukin et al. |
| 6,823,717 | B2 | 11/2004 | Porter et al. |
| 6,823,724 | B1 * | 11/2004 | Kobayashi et al. ............ 73/105 |
| 6,882,051 | B2 | 4/2005 | Majumdar et al. |
| 6,887,365 | B2 | 5/2005 | Naughton |
| 6,945,099 | B1 | 9/2005 | Su et al. |
| 7,302,856 | B2 | 12/2007 | Tang |
| 2002/0166962 | A1 | 11/2002 | Roukes et al. |
| 2002/0174715 | A1 | 11/2002 | Takahashi et al. |
| 2002/0175408 | A1 | 11/2002 | Majumdar et al. |
| 2002/0178801 | A1 | 12/2002 | Takahashi et al. |
| 2003/0062193 | A1 | 4/2003 | Thaysen et al. |
| 2003/0089182 | A1 | 5/2003 | Thaysen et al. |
| 2003/0135971 | A1 | 7/2003 | Liberman et al. |
| 2003/0173864 | A1 * | 9/2003 | Zalalutdinov et al. ....... 310/309 |
| 2003/0203531 | A1 | 10/2003 | Shchukin et al. |
| 2005/0034529 | A1 | 2/2005 | Tang et al. |
| 2005/0109925 | A1 | 5/2005 | El Rifai et al. |
| 2005/0150280 | A1 * | 7/2005 | Tang et al. ................... 73/105 |
| 2005/0212529 | A1 | 9/2005 | Huang et al. |
| 2005/0214803 | A1 | 9/2005 | Wang |
| 2005/0236357 | A1 | 10/2005 | Bakkers et al. |
| 2005/0244326 | A1 | 11/2005 | Colbert et al. |
| 2005/0275502 | A1 | 12/2005 | Goebel et al. |

FOREIGN PATENT DOCUMENTS

| | | |
|---|---|---|
| WO | WO 03/095617 A2 | 11/2003 |
| WO | WO 2004/041998 A2 | 5/2004 |

OTHER PUBLICATIONS

Harley et al., "1/F Noise Consideration for The Design and Process Optimization of Piezoresistive Cantilevers," Journal of Microelectromechanical Systems, vol. 9, No. 2, IEEE, Jun. 2, 2000, pp. 226-235.

Hutter et al., "Calibration of Atomic-Force Microscope Tips," Rev. Sci. Instrum., vol. 64, No. 7, American Institute of Physics, Jul. 1993, pp. 1868-1873.

Kuczynski, "Effect of Elastic Strain on The Electrical Resistance of Metals," Physical Review, vol. 94, No. 1, Apr. 1, 1954, pp. 61-64.

Li et al., "Thin Gold Film Strain Gauges," J. Vac. Sci. Technol., vol. 12, No. 3, American Vacuum Society, May 1994, pp. 813-819.

Parker et al., "Electrical Resistance-Strain Characteristics of Thin Evaporated Metal Films," Journal of Applied Physics, vol. 34, No. 9, Sep. 1963, pp. 2700-2708.

Physics Web, "Nanoelectromechanical Systems Face The Future," Physics World Magazine, vol. 14, Issue 2, Feb. 2001, http://physicsweb.org/article/world/14/2/8.

Reid et al., "6-MHz 2-N/m Piezoresistive Atomic-Force-Microscope Cantilevers With Incisive Tips," Journal of Microelectromechanical Systems, vol. 6, No. 4, IEEE, Dec. 4, 1997, pp. 294-302.

Thaysen et al., "Polymer-Based Stress Sensor With Integrated Readout," Journal of Physics D: Applied Physics, vol. 35, Institute of Physics Publishing Ltd., 2002, pp. 2698-2703.

Tortonese et al., "Atomic Resolution With An Atomic Force Microscope Using Piezoresistive Detection," Applied Physics Letters, vol. 62, No. 8, American Institute of Physics, Feb. 22, 1993, pp. 834-836.

Yang et al., "Monocrystalline Silicon Carbide Nanoelectromechanical Systems," Applied Physics Letters, vol. 78, No. 2, American Institute of Physics, Jan. 8, 2001, pp. 162-164.

Melosh et al., "Ultrahigh-Density Nanowire Lattices and Circuits," Science, Apr. 4, 2003, vol. 300, pp. 112-115.

Hrovat et al., "A characterisation of thick film resistors for strain gauge applications," J. Mater. Sci., 2001, vol. 36, pp. 2679-2689.

Knight et al., "Effect of Structure on the Piezoresistive Properties of Thin Metal Films," J. Vac. Sci. Technol., 6, 706-710, 1969.

Chung et al., "Micromachined metal thin-film pressure sensor suitable for batch process," Electronics Letters, Oct. 24, 2002, vol. 38, No. 22, 1344-1346.

Pattabi et al., "A simple strain cell for the measurement of gauge factor of a thin film," Rev. Sci. Inst., Apr. 1999, vol. 70, No. 4, pp. 2074-2075.

Bishay et al., "Applicability of discontinuous palladium films as strain gauges," J. Mater. Sci., 1992, vol. 3, pp. 195-199.

Jen et al., "Piezoresistance characteristics of some magnetic and non-magnetic metal films," J. Magn. Magn. Mater., 2003, vol. 256, pp. 54-62.

McGuire et al., "Anisotropic Magnetoresistance in Ferromagnetic 3d Alloys," IEEE Trans. Mag-11, Jul. 4, 1975, No. 4, pp. 1018-1038.

Rajanna et al., "Pressure transducer with Au-Ni thin-film strain gauges," IEEE Trans. Electron Devices, Mar. 1993, vol. 40, No. 3, pp. 521-524.

Sampath et al., "Behaviour of Bi-Sb alloy thin-film strain gauges," Thin-Solid Films, 1986, 137, pp. 199-205.

Chiriac et al., "Ni-Ag thin films as strain-sensitive materials for peizoresistive sensors," Sensors and Actuators A, 1999, vol. 76, pp. 376-380.

Lei et al., "Thin film thermocouples and strain gauge technologies for engine applications," Sensors and Actuators A, 1998, vol. 65, pp. 187-193.

Guckel et al., "Surface micromachined pressure transducers," Sensors and Actuators A, 1991, vol. 28 (2), pp. 133-146.

Patridge et al., "High-performance planar peizoresistive accelerometer," JMEMS, Mar. 1, 2000, vol. 9, No. 1, pp. 58-66.

Chui et al., "Independent detection of vertical and lateral forces with a sidewall-implanted dual-axis piezoresistive cantilever," Appl. Phys. Lett., Mar. 16, 1998, vol. 72, No. 11, pp. 1388-1390.

Dehe et al., "A piezoresistive GaAs pressure sensor with GaAs/AlGaAs membrane technology," J. Micromech. Microeng., 1995, vol. 5, pp. 139-142.

Hsu et al., "Piezoresistive response induced by piezoelectric charges in n-type GaAs mesa resistors for application in stress transducers," J. Appl. Phys. Jan. 1, 1999, vol. 85, No. 1, pp. 333-340.

Tang et al., "Two-dimensional electron-gas actuation and transduction for GaAs nanoelectromechanical systems," Appl. Phys. Lett. Nov. 11, 2002, vol. 81, No. 20, pp. 3879-3881.

Konczewicz et al., "GaAlAs-Based Micromachined Accelerometer," Phys. Stat. Sol. B, 2001, vol. 223, pp. 593-596.

Bykhovski et al., "Piezoresistive effect in wirtzite n-type GaN," Appl. Phys. Lett. Feb. 5, 1996, vol. 68, No. 6, pp. 818-819.

Gaska et al., "Piezoresistive effect in GaN-AlN-GaN structures," Appl. Phys. Lett., Dec. 29, 1997, vol. 71, No. 26, pp. 3817-3819/.

Gaska et al., "Piezoresistive effect in AlN/GaN short range superlattice structures," J. Appl. Phys. May 1, 1999, vol. 85, No. 9, pp. 6932-6934.

Mosser et al., "Energy shifts due to the local environment of DX centers in $Al_xGa_{1-x}As:Si$," Mater. Sci. Forum, 1994, vols. 143/147, pp. 1117-1122.

Eickhoff et al., "Piezoresistivity of $Al_xGa_{1-x}N/GaN$ heterostructures," J. Appl. Phys. Oct. 1, 2001, vol. 90, No. 7, pp. 3383-3386.

Van Vessem et al., "Rediscovering the Strain Gauge Pressure Sensor," Sensors online, vol. 16, No. 4, 6 pgs., Apr. 1999.

* cited by examiner

FIGURE 1A
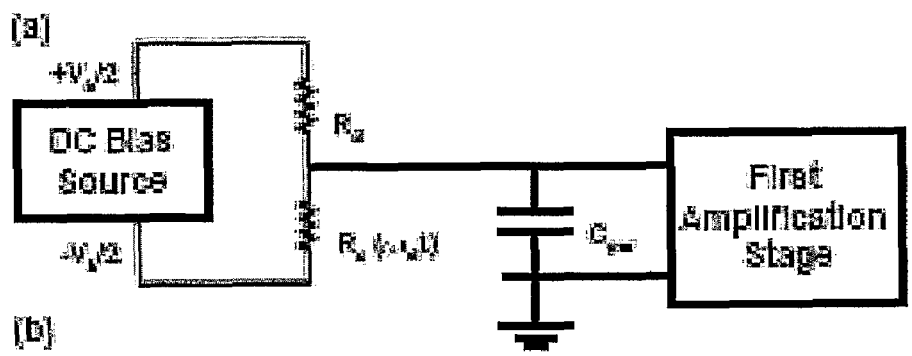
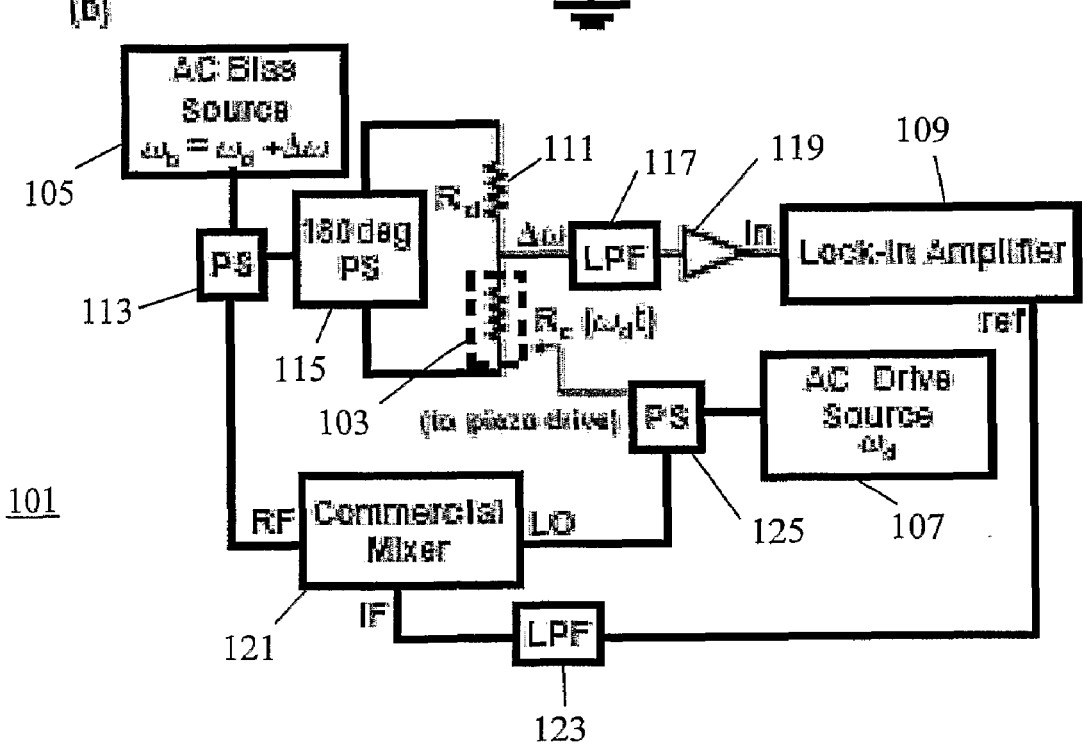
FIGURE 1B

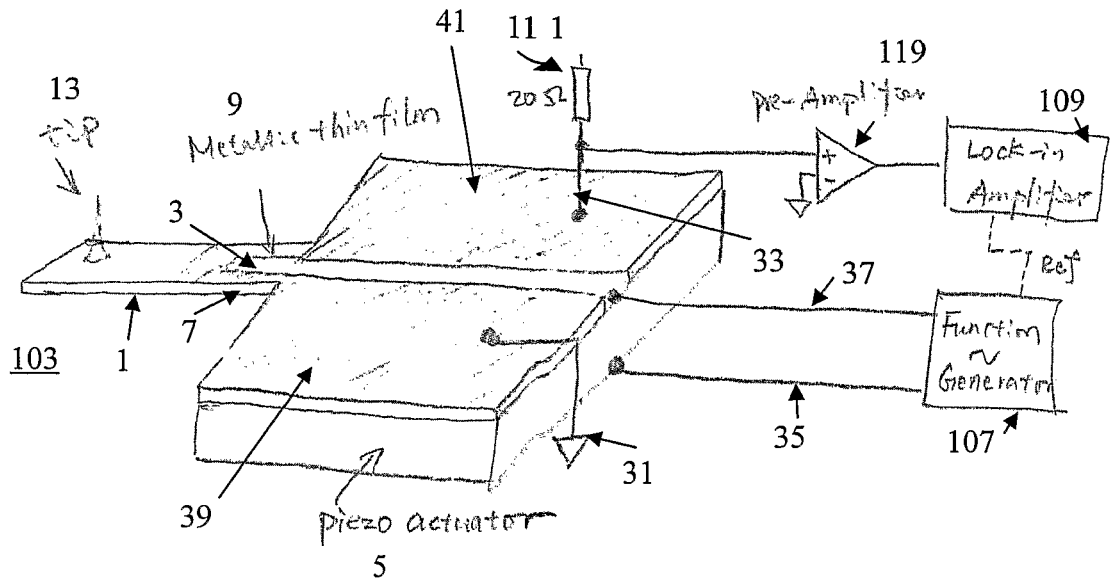
FIGURE 7A
FIGURE 7B
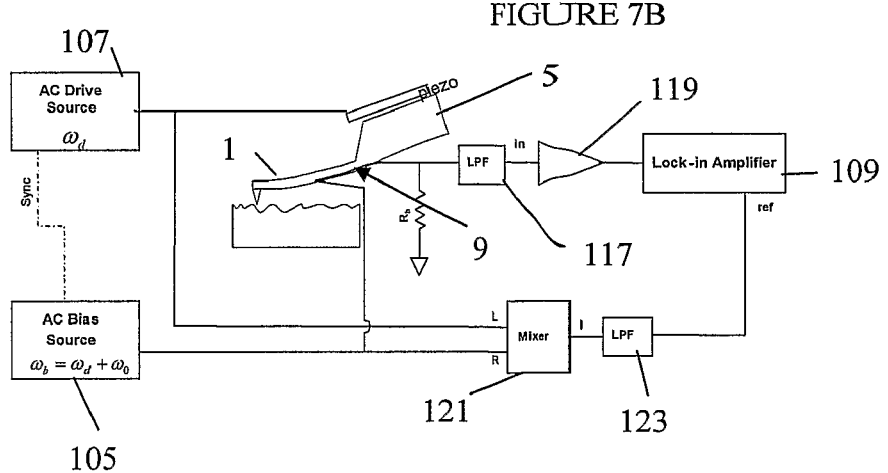

FIGURE 15
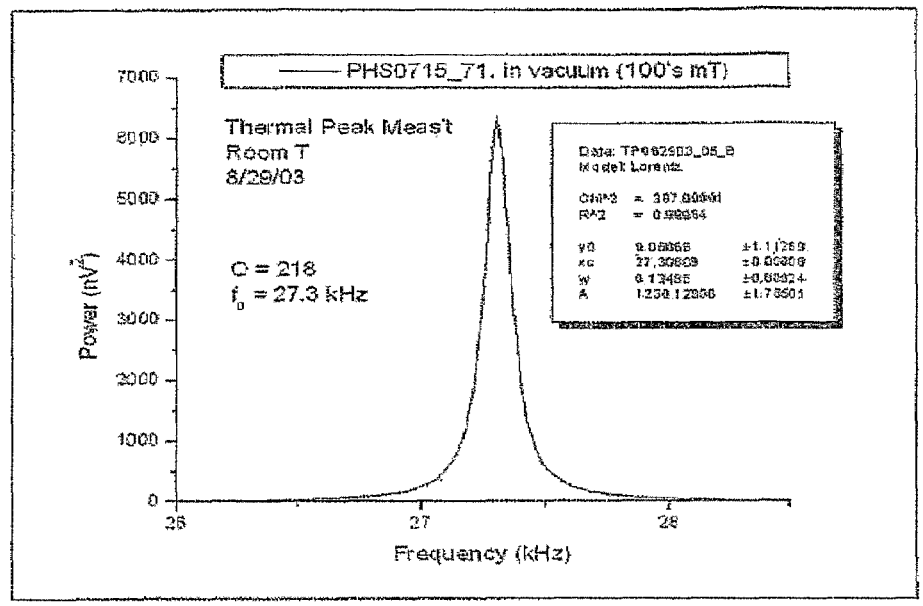
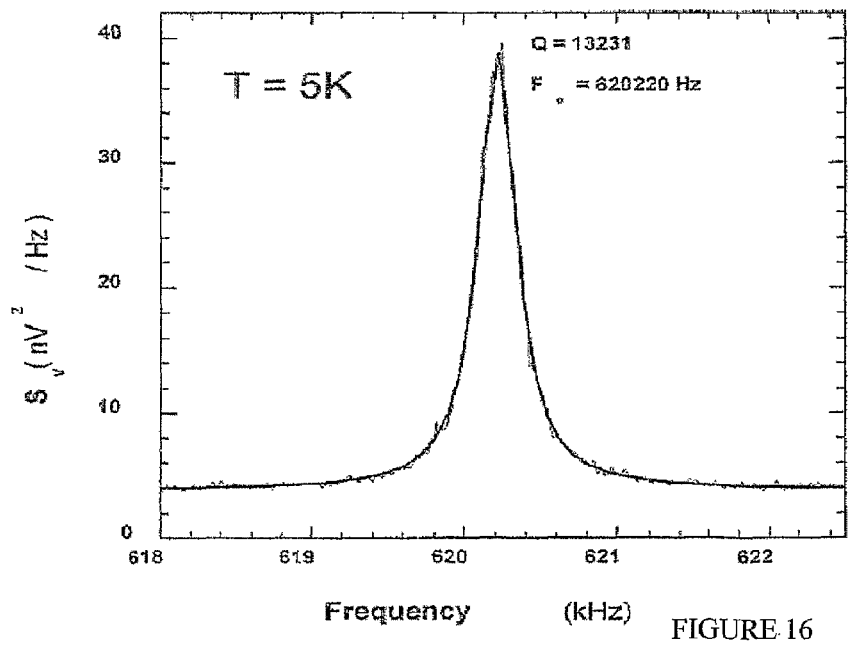
FIGURE 16

DETECTION OF RESONATOR MOTION USING PIEZORESISTIVE SIGNAL DOWNMIXING

CROSS-REFERENCE TO RELATED APPLICATIONS

This application is a continuation-in-part of U.S. application Ser. No. 11/010,578 filed Dec. 14, 2004. This application also claims benefit of priority of both U.S. Provisional Application Ser. No. 60/562,652, filed Apr. 15, 2004, and U.S. Provisional Application Ser. No. 60/547,168, which was assigned a filing date of Feb. 25, 2004. All of the above mentioned applications are incorporated herein by reference in their entirety.

STATEMENT REGARDING FEDERALLY SPONSORED RESEARCH OR DEVELOPMENT

The U.S. Government may have certain rights in this invention pursuant to grant number ECS-0O89061 from the NSF and grant numbers DSO-MOSAIC N00014-02-1-0602 and MTO/SPAWAR N66001-02-1-8914 from DARPA.

BACKGROUND OF THE INVENTION

1. Field of the Invention

This invention is related to micro-electro-mechanical systems (MEMS) and nano-electro-mechanical systems (NEMS).

2. Description of the Prior Art

The field of microelectromechanical systems (MEMS) has received increased attention in recent years in both the scientific and technological realms. Recent experimental efforts have expanded this field into the nanometer-scale regime (so-called nanoelectromechanical devices, or NEMS), increasing operating frequencies to the megahertz or even gigahertz range. At such frequencies a host of new applications become possible, from sensitive charge detection, to mass sensing, biological imaging, and quantum measurement.

Current methods for displacement detection in NEMS include magnetomotive, optical interferometric, and single electron transistor techniques. An alternate method utilizes piezoresistive strain sensors integrated directly into the device. Piezoresistors have previously been incorporated into microscale cantilevers and used in atomic force microscopy, data storage, and biosensing.

The piezoresistor containing devices achieve high strain sensitivity by using semiconductor-based piezoresistors, primarily doped Si or AlGaAs. Compared with other detection methods, piezoresistive systems have the advantages of being fully integrated sensors that operate from room temperature down to at least 4 K and do not require a magnetic field. Resonance detection of cantilevers up to 9 MHz has been achieved previously using doped Si piezoresistors. Generally, direct current (DC) biasing is used in the piezoresistive resonance detection of cantilevers.

However, it has proved difficult to achieve high quality results using the piezoresistive technique in NEMS due to the intrinsically high resistances (5-100 k$\Omega$) of these devices, which leads to frequency-dependent signal attenuation at MHz frequencies if direct current detection is used. Such attenuation poses a significant limitation to this method as the resonance frequencies are increased to the high-frequency range and beyond.

One way of handling this frequency-dependent transmission loss is to transform the impedance of the NEMS device down to 50 Ohm by inserting appropriate circuitry before the transmission line. However, this may be difficult if the impedance mismatch ratio is greater than 100 and impractical if the same detection setup is to be used with many devices of different frequencies.

BRIEF SUMMARY OF THE INVENTION

An embodiment of the invention provides a system containing a micro-mechanical or nano-mechanical device and a method of operating the same. The device includes a resonator and a piezoresistive element connected to the resonator. The method includes AC biasing the piezoresistive element at a first frequency, driving the resonator at a second frequency different from the first frequency, and detecting a mechanical response of the resonator at one or both of a difference frequency and a sum frequency of the first and second frequencies.

BRIEF DESCRIPTION OF THE DRAWINGS

FIG. 1A is a schematic of a circuit with a DC readout scheme.

FIG. 1B is a schematic of a circuit of the first embodiment of the present invention.

FIGS. 7A and 7B are schematics of a testing set up used to test the devices of one example of the present invention.

FIGS. 15 and 16 are plots of power and $S_v$ versus frequency, respectively, for an SPM probe of the second embodiment of the invention.

DETAILED DESCRIPTION OF THE INVENTION

1. First Embodiment

Figure 2A:
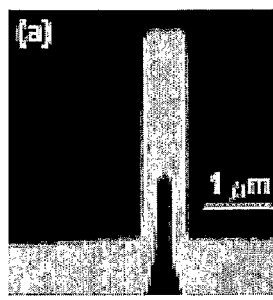
FIG. 2A is a scanning electron micrograph of a cantilever according to an example of the first embodiment of the invention.

In a first embodiment of the invention, the present inventors have developed a system and method for measuring RF-range resonance properties of nano- or micro-mechanical devices which comprise entire or parts of micro- or nano-electro-mechanical systems (MEMS and NEMS, respectively), with integrated piezoresistive strain detectors serving as signal downmixers. Preferably but not necessarily, the piezoresistive elements comprise thin film elements and the technique takes advantage of the high strain sensitivity of thin film piezoresistors, while overcoming the problem of RF signal attenuation due to a high source impedance. The technique also reduces the effect of the cross-talk between the detector and actuator circuits. The method also allows a way to circumvent the problem of impedance mismatch and extends the usability of low-frequency, high-input-impedance preamplifiers and other equipment.

In one aspect of the first embodiment, the method includes using AC biasing and the intrinsic properties of the piezoresistor to perform heterodyne downmixing of the signal to a much lower frequency, which can then be detected by standard circuitry without significant signal loss. Not only does this increase the detected signal, it also reduces unwanted background from the cross-talk between the detector and actuator circuits. In one example described below, this downmixing scheme is applied to the detection of mechanical response of cantilever NEMS with fundamental mode frequencies of 5-25 MHz to achieve thermal noise-limited detection of mechanical resonances in these devices at room temperature, demonstrating the ultimate sensitivity of downmixed piezoresistive signal detection in resonant high-frequency NEMS applications. In another example described below, this downmixing scheme is applied to the detection of mechanical response of a cantilever probe resonator in an atomic force microscope (AFM) (i.e., in a MEMS application). It should be noted that the term "mechanical response" is not limited to mechanical displacement (i.e., movement), and includes other mechanical responses, such as stress. Thus, while the examples illustrate the detection of mechanical displacement of a resonator, the amount of stress in the resonator can also be detected instead of or in addition to the detection of the mechanical displacement. For example, when the system containing the resonator comprises a chemical or biological sensor, the stress in the resonator arising from binding of chemical or biological species to the resonator may be detected.

FIG. 1A illustrates the difficulties in a prior art method of applying low-frequency techniques to high-frequency piezoresistive NEMS. In most applications, the piezoresistor $R_c$ is placed in a bridge or half-bridge configuration with a fixed dummy resistor $R_d$. For simplicity, it is assumed that $R_c = R_d = R$ when the NEMS is at rest. The ends of the resistors are oppositely DC biased at $+V_b/2$ and $-V_b/2$, so that the voltage at the bridge point is zero when the NEMS is not moving. When the NEMS is driven at a frequency $w_d$, $R_c$ gains a time-dependent component: $R_c = R + \Delta R \cos(w_d t + \phi)$, where a typical value of $\Delta R/R \leq 10^{-5}$. This resistance variation produces the standard resistance-bridge voltage $V_{out} \approx V_b (\Delta R/4R) \cos(w_d t + \phi)$ at the bridge point.

To measure $V_{out}$, the bridge output must be connected in some way to a circuit, e.g., the input of a high-input-impedance preamplifier. At moderately high frequencies (<30 MHz), this effectively introduces capacitances $C_{par}$ to ground in parallel with the cantilever and dummy resistor, effectively forming a low-pass filter with a cut-off frequency of $(\pi R C_{par})^{-1}$. With typical amplifier-input and cable capacitances $C_{par} \leq 10$ pF, and $R \leq 10$ k$\Omega$, the AC output is strongly attenuated at $w_d/2\pi > 2$ MHz. At very high frequencies, the measurements are further complicated by cable resonances.

FIG. 1B illustrates a circuit schematic of a system 101 according to one example of the first embodiment of the invention. The system includes a micro-mechanical or nano-mechanical device 103. The device 103 may comprises for example, a scanning probe microscope (SPM) probe, such as an AFM probe, a mass sensor, a charge sensor, a force sensor, a pressure sensor, a flow sensor, a chemical sensor, a biological sensor, an inertial sensor, a biological imaging device or any other suitable device which comprises an entire MEMS or NEMS or a portion thereof.

The device 103 includes a resonator and a piezoresistive element connected to the resonator (not shown in FIG. 1B for clarity). The resonator may comprise a cantilever, a torsional resonator, a doubly clamped beam, a diaphragm resonator, which are described in more detail below, or any other type of resonating element. The piezoresistive element may comprise a thin film which is coated on a surface of the resonator or which is encapsulated in whole or in part within the resonator. For example, the piezoresistive element may comprise a metal or semiconductor film coated on a surface of the resonator. Alternatively, the resonator may comprise a doped region in a portion of a semiconductor cantilever, such as a p+ doped region in a silicon cantilever.

The system 101 also includes an AC bias source 105. The AC bias source is electrically connected to the piezoresistive element of the device 103. In other words, the source 105 is either directly or indirectly connected to the piezoresistive element to provide an AC bias (i.e., an alternating voltage) to the piezoresistive element at a first frequency, $\omega_b$, which will be described in more detail below.

The system 101 also includes an AC drive source 107. The AC drive source 107 is operatively connected to the resonator of the device 103. In other words, the source 107 is either directly or indirectly connected to the device 103 to drive the resonator of the device 103 at a second frequency, $\omega_d$, different from the first frequency. For example, the AC drive source 107 may be electrically connected to a piezoactuator (not shown in FIG. 1) which is adapted to oscillate the resonator of the device 103 at the second frequency. Preferably, the second frequency comprises the resonator's resonance frequency and which differs from the first frequency by 100 kHz or less.

The system 101 also includes a phase sensitive detector 109. The detector is electrically connected to the piezoresistive element of the device and is adapted to detect a mechanical response of the resonator. In other words, the detector is adapted to receive an electrical signal from the piezoresistive element to detect a mechanical response of the resonator, such as the oscillation or changes in oscillation of the resonator. Preferably, the detector 109 comprises a lock-in amplifier, but may comprise other suitable phase sensitive detectors. The detector 109 is adapted to detect the mechanical response of the resonator at one or both of a difference frequency and a sum frequency of the first and second frequencies. Preferably, the detection is conducted at the difference frequency, as will be described in more detail below.

The system 101 also contains a dummy resistor 111 located in a bridge configuration (i.e., in series) with the device 103.

The AC bias source 105 provides a first voltage ($V_b$) having the first frequency to both the piezoresistive element of the device 103 and to the resistor 111. For example, the AC bias source provides balanced biasing at frequency $\omega_b$ to the piezoresistive element of the device 103 and to the resistor 111 via a power splitter 113 and a 180 degree power splitter 115.

The system 101 also contains a first low pass filter 117 whose output is electrically connected to an input of the lock-in amplifier 109 and whose input is electrically connected to a bridge point between the resistor 111 and the device 103. The downmixed output from the bridge point is provided through the filter 117, then amplified in amplifier 119, and then provided into the lock-in amplifier 109.

The system 101 also contains a mixer 121 whose first input is electrically connected to an output of the AC bias source 105, whose second input is electrically connected to an output of the AC drive source 107, and whose output is electrically connected via a second low pass filter 123 to a reference input of the lock-in amplifier 109. For example, the AC bias source 105 is connected to the mixer 121 via the first power splitter 113 and the AC drive source 107 is connected to the mixer 121 via a second power splitter 125. The mixer 121 provides a downmixed reference signal to the lock-in amplifier 109.

In the method of using the system 101 of FIG. 1B, the piezoresistive element (i.e., piezoresistor) is used to downmix the displacement signal to a lower frequency. This is achieved by applying an AC voltage $V_b(t) = V_{b0} \cos(W_b t)$ from AC bias source 105 across the device 103 and resistor 111 at a frequency $W_b$, offset from the drive frequency by an amount $\Delta w \equiv w_b - w_d$. Using the 180° power splitter 115, the voltage is applied oppositely to the ends of the device 103 and resistor 111, to null the bias voltage at the bridge point. The bias produces an AC current $I(t) = V_{b0} \cos(w_b t)/(R_d + R_c)$; to leading order in $\Delta R/R$, the output voltage, $V_{out}$ then becomes:

$$V_{out}(t) \approx \frac{V_{b0} \cos(\omega_b t)}{4R}(\Delta R \cos(\omega_d t + \phi)) \approx$$
$$V_{b0} \frac{\Delta R}{8R} |\cos(\Delta \omega t - \phi) + \cos((2\omega_d + \Delta \omega)t + \phi)|.$$

Thus, the output signal at the bridge point contains two frequency components, at the sum and difference of the drive and bias frequencies. With $\Delta w$ sufficiently small, preferably 200 kHz or less, such as 100 kHz or less, the downmixed frequency component is attenuated minimally by the parallel capacitances. The output is then sent through the low pass filter 117 to remove any residual carrier and the upper sideband, amplified in amplifier 119, and finally fed into the lock-in amplifier 109 for detection. The lock-in reference is generated by splitting off the bias and drive voltages with power splitters 113 and 125 and sending the voltages into a mixer 121, such as any commercial mixer, which generates a downmixed signal in parallel with the device 103.

This electromechanical downmixing effect is a fully linear property of the piezoresistor. The piezoresistor down-converts any signal to an amplitude half that of the signal that would be generated with a DC bias of the same magnitude. In contrast, any parasitic cross-talk signal from the actuation circuit would need to pass through an element with a nonlinear I-V response in order to mix with the bias voltage down to the frequency $\Delta w$. The I-V nonlinearity of the piezoresistors of the examples of the present invention is quite small, so that even extremely weak displacement signals can be downmixed and extracted from the device with minimal attenuation and background.

A. First Example of First Embodiment

In a first example of the first embodiment, the downmixing scheme is tested using high-frequency piezoresistive cantilevers as the NEMS device 103. The cantilevers are fabricated from silicon-on-insulator (SOI) wafers, where the top Si layer consists of 80 nm Si plus a 30 nm layer of boron-doped p-Si to act as the piezoresistive strain sensor (i.e., a semiconductor piezoresistive film). The cantilevers were fabricated in a manner similar to that of described in J. A. Harley and T. W. Kenny, Appl. Phys. Lett. 75, 289 (1999), where a backside KOH etch suspends the top Si layer as a membrane, and a combination of electron beam lithography, liftoff, and fluorine/chlorine-based plasma etching steps forms the cantilever from the membrane. A typical cantilever is shown in FIG. 2A. Cantilever lengths ranged between about 2-3 μm and widths were approximately 700 nm. For example, the exemplary cantilever shown in FIG. 2A is 3.2 microns long, 700 nm wide and 110 nm thick. The cantilever includes a notch and leg portions surrounding the notch. The piezoresistive film is located at least on the leg portions of the cantilever.

Figure 2B:
FIG. 2B is an optical micrograph of a cantilever and dummy resistor according to an example of the first embodiment of the invention. Three gold leads at the bottom of the image connect the components to the rest of the circuit shown in FIG. 1B.

As shown in FIG. 2B, the dummy resistor 111 is fabricated on-chip using the same p-Si material that provides the cantilever strain sensor, in order to minimize parallel capacitances. The cantilever and dummy resistances varied from device to device, and are in the range of 50-150 kΩ. The cantilever chip is mounted onto a piezoelectric ceramic actuator disk with a thickness of approximately 80 um, corresponding to a thickness-mode resonance frequency of about 25 MHz. This assembly was in turn mounted onto a circuit board and placed into a vacuum chamber for measurements at room temperature.

Figures 3A, 3B:
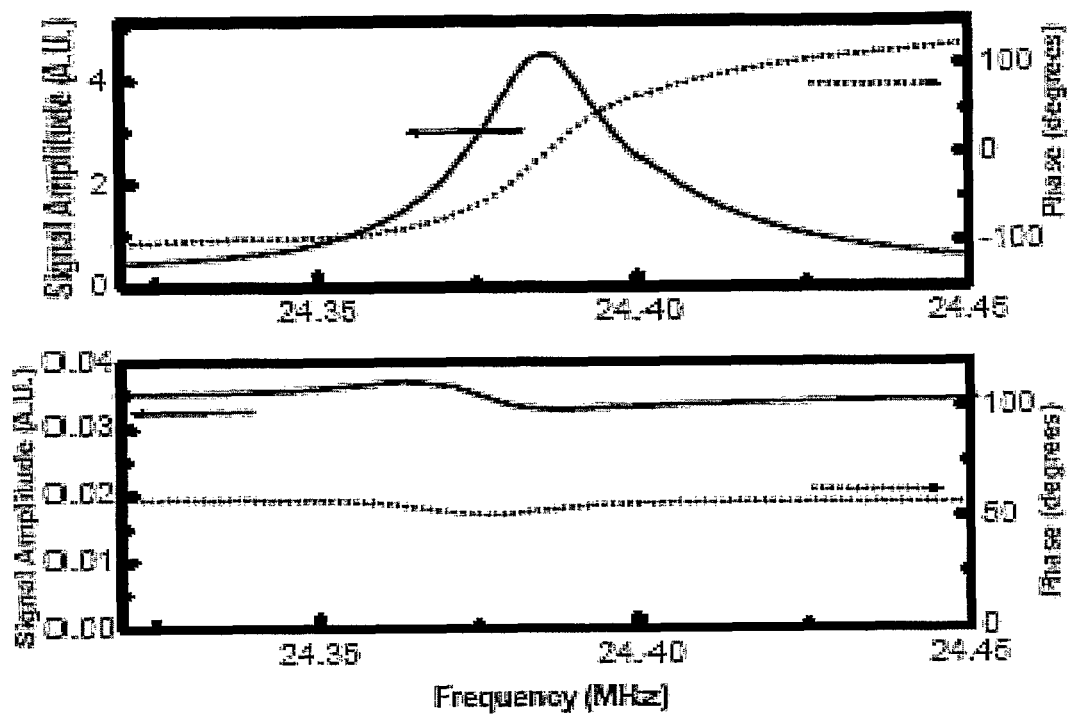
FIGS. 3A and 3B are plots of signal amplitude versus frequency. The plot in FIG. 3A was measured using the down conversion scheme of the first embodiment of the invention and the plot in FIG. 3B was measured directly with a network analyzer.

FIG. 3A shows a resonance curve for a 1.7-μm long cantilever using the above described downmixing method. Here $V_{b0} = 3$ V, offset frequency is $\Delta w/2\pi = 100$ kHz, and a peak-to-peak voltage of 1.9 V is applied to the piezoactuator. The amplitude is normalized to drive and bias levels. The resonance is approximately fc=24.4 MHz, close to but somewhat below the theoretically predicted fundamental-mode resonance frequency of 27 MHz. The square of the voltage signal is proportional to the energy in the cantilever. Fitting this quantity to a Lorentzian yields a width of 18.2 kHz, implying a quality factor of Q≈1300.

For comparison, FIG. 3B shows the same cantilever resonance measured in the standard DC half-bridge configuration (see M. Tortonese, R. C. Barrett, and C. F. Quate, Appl. Phys. Lett. 62, 834 (1993)) using a DC bias of 5 V across $R_c$ and $R_d$ and a 50-Ohm high-frequency network analyzer for drive (approximately 1 $V_{pp}$) and detection. In both measurements no impedance matching had been performed, and the signal amplitude is normalized to the drive and bias levels. The resonant signal in the downmixing scheme is approximately 1000 times larger than in the direct measurement scheme. In addition, the relative magnitude of the background, caused by parasitic coupling of the drive signal to the detection circuit, is nearly three orders of magnitude smaller in the downmixing case. As a result, the downmixed resonance is essentially Lorentzian, while the network analyzer resonance is highly distorted.

Figure 4:
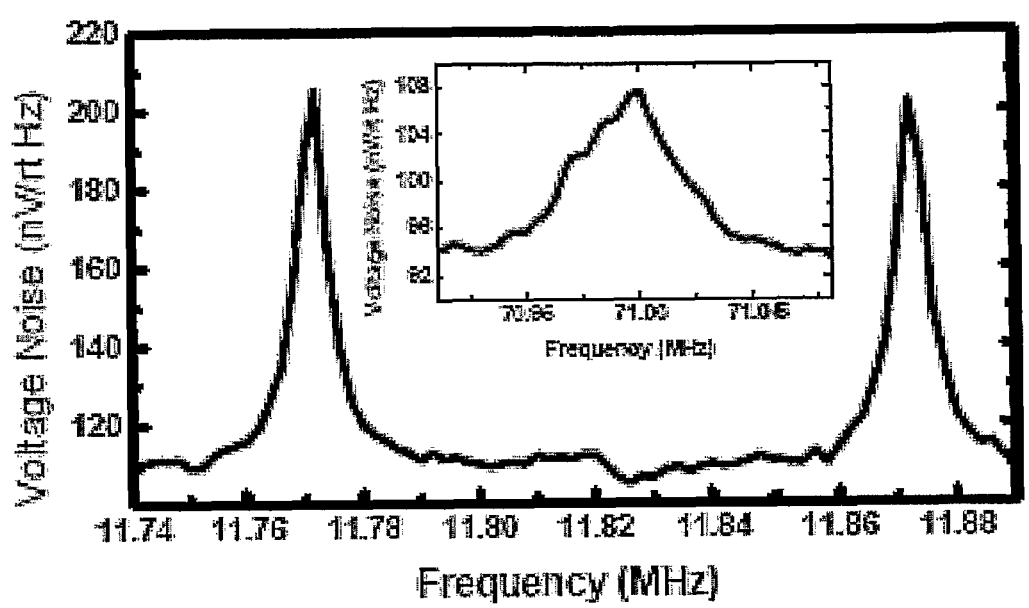
FIG. 4 is a plot of voltage noise versus frequency which illustrates thermomechanical noise peaks from the fundamental vibration mode of a 2.6 micron long cantilever. The inset shows one of the noise peaks from the second vibration mode of the same cantilever.

The downmixing technique is sensitive enough to detect the thermomechanical fluctuations of the cantilever when it is not driven externally. This is done by applying only a bias voltage, and, while sweeping the bias, detecting narrowband noise at the offset frequency Δw. FIG. 4 shows the thermomechanical noise for a 2.6 μm long cantilever with fundamental mode frequency fc=11.9 MHz, using Δw/2π=50 kHz. The noise appears as two peaks spaced 100 kHz apart because the noise in the cantilever at the resonance frequency is mixed to the 50 kHz reference when the bias is either 50 kHz above or below the cantilever resonance. The peak noise amplitude agrees with a theoretical estimate based on the previously measured piezoresistive gauge factor of similar cantilever devices. Note that the thermal conduction calculations predict the cantilever to be approximately 20 K hotter than the environment due to Joule heating of the piezoresistor in this experiment. The off-resonance noise floor of 110 nV/$\sqrt{Hz}$ is approximately twice that expected from a combination of thermomechanical noise and Johnson noise (the preamplifier input noise is negligible in the present case). The precise origin of this excess noise is unclear. However, the noise floor can be reduced to the expected Johnson noise level (~60 nV/$\sqrt{Hz}$) by increasing the offset frequency and decreasing the bias voltage, while still maintaining the visibility of the thermomechanical noise peak on resonance. In comparison, the network analyzer measurement has input-referred noise amplitude of about 7 nV/$\sqrt{Hz}$. The thermomechanical noise peak, attenuated by more than three orders of magnitude because of the low 50-Ohm input impedance of the network analyzer, would be nearly undetectable against this background.

Without wishing to be bound by a particular theory, the inventors believe that since the peak noise amplitude in FIG. 4 is about twice larger than the off-resonant noise floor leads to a conclusion that the thermal excitation is the main source of noise in resonant experiments with this device. The corresponding force sensitivity can be calculated by using a value of the spring constant k≈0.5 N/m determined from the device dimensions and the elastic properties of Si. When Johnson noise is included, the overall resonant force sensitivity at 11.9 MHz is $F_N$≈350 aN/$\sqrt{Hz}$ at room temperature, comparable to the lower-frequency cantilever devices studied previously (see J. A. Harley and T. W. Kenny, Appl. Phys. Lett. 75, 289 (1999)).

The thermomechanical noise peak remains visible in the downmixed scheme at even higher frequencies, as demonstrated by detection of the thermal noise peak from the second vibration mode of the 11.9-MHz cantilever (inset to FIG. 4), whose driven resonance is detected at approximately 71 MHz. This demonstrates that the technique as presented here is viable for even smaller NEMS whose fundamental modes lie in the VHF range. In addition, while the measurements were performed at room temperature, both Johnson and thermomechanical voltage noise vary with temperature T as $\sqrt{T}$, so that noise-limited detection of piezoresistive NEMS should scale well to lower temperatures as well.

B. Second Example of the First Embodiment

Figures 5A, 5B:
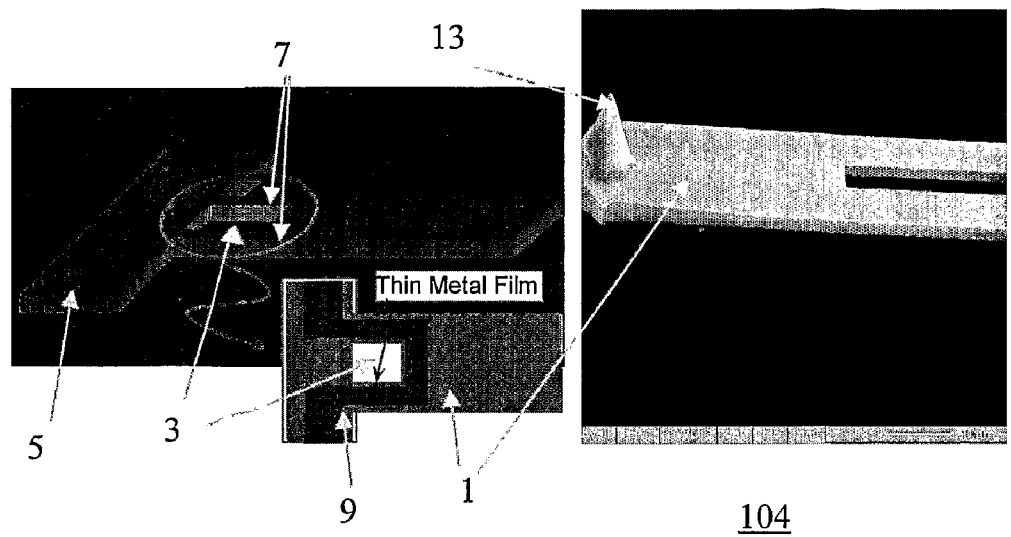
FIG. 5A is a three dimensional schematic view of a device according to an embodiment of the invention.
FIG. 5B is an SEM image of an AFM probe according to an embodiment of the invention.

In a second example of the first embodiment, the heterodyne downmixing scheme is illustrated for a micro-mechanical device comprising an AFM probe. FIG. 5A is a schematic and FIG. 5B is an SEM image of an exemplary micromachined cantilever (i.e., probe) 103 with the following microscale dimensions: 150 μm long×30 μm wide×4 μm thick. The probe 103 contains a cantilever resonator 1, a notch 3, a base 5, legs 7, a metal film 9 and a sharp AFM tip 13. The metal film 9 acts as the piezoresistive element. However, a semiconductor film or doped region may be used instead. Preferably, but not necessarily, the metal film 9 is formed on the same side of the cantilever as the tip 13. The specific probe 103 shown in FIG. 5B is designed for tapping mode AFM. Similar probes may be used for non-contact mode AFM.

Figure 6:
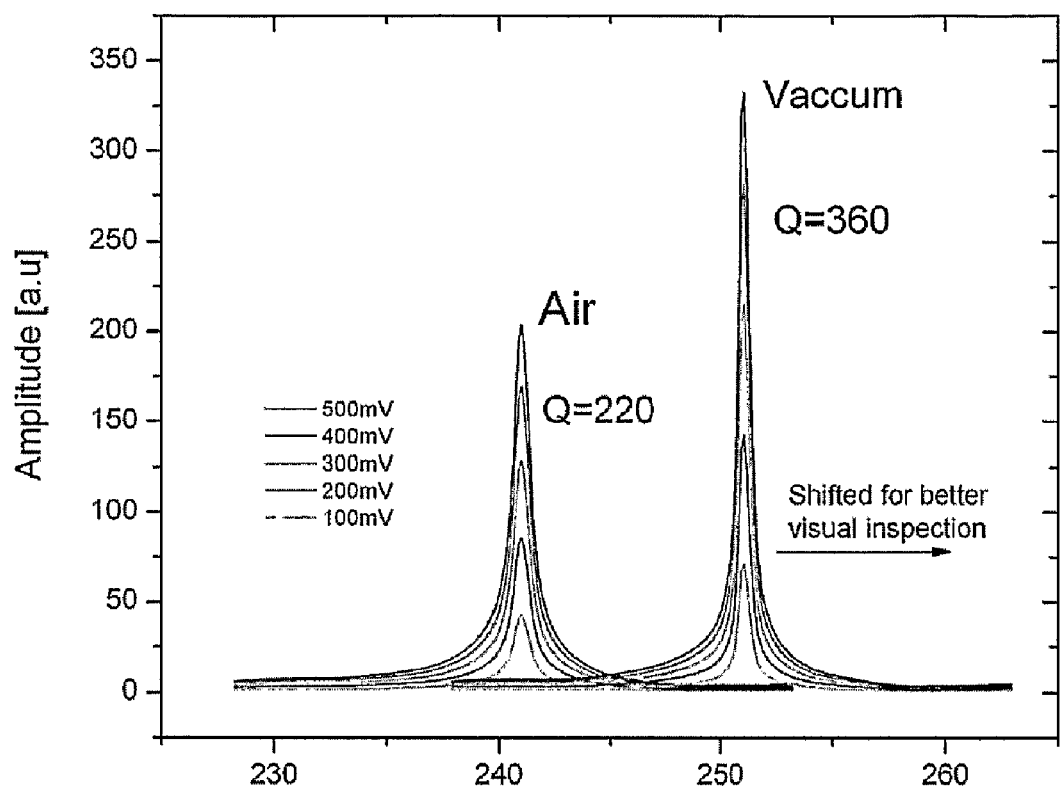
FIGS. 6 and 8 are plots of piezoresistive response of devices of an embodiment of the invention.

FIG. 6 illustrates a piezoresistance response of a metal film on the cantilever similar to that in FIG. 5B according to another aspect of the second example of the present invention. The cantilever is 125 microns long, 40 microns wide and 4 microns thick with a conventional tip. The cantilever is suitable for a self-sensing probe 103 designed for tapping mode AFM applications. A gold thin film covers the two legs of the cantilever and forms a current loop. A very strong piezoresistance response is observed, as shown in FIG. 6. Non-resonant background signal is subtracted from the raw data. The quality factor for this specific cantilever is about 220 in air. Under vacuum conditions, the piezoresistance response is stronger, with quality factor rising above 360. The data for vacuum is shifted to the right for better visual inspection.

FIG. 7A illustrates the measurement set up of the AFM probe 103 and FIG. 7B schematically illustrates a circuit scheme to measure the piezoresistive response of the AFM probe 103 when the probe is used in tapping/non-contact/AC mode AFM. As described above, the bias current through piezoresistive element 9 is modulated at one frequency, while the cantilever 1 is driven at another, different frequency. The mechanical response of the cantilever is detected at their difference frequency and/or their sum frequency.

Thus, as shown in FIG. 7B, the AC drive source 107 is used to drive the cantilever 1 through a piezo drive source in the base 5. The drive source 107 is synchronized with the AC bias source 105 and the outputs of the AC drive and bias sources are provided into different inputs of the mixer 121. The output of the mixer 121 is provided through a low pass filter 123 into the lock-in amplifier 109 as a reference signal. The AC bias source 105 is used to bias the metal film 9, whose output is also provided into the lock-in amplifier 109 through another LPF 117 and amplifier 119. In the scheme of FIG. 7B, the AC drive source 107 can be used to drive the cantilever 1 at resonant frequency, such as 240 kHz for example. Direct lock-in measurement can be employed to detect the amplitude of the oscillation. To remove the electrical background due to crosstalk, the second example also employs the downmix detection scheme. The sample bias current may be applied at a frequency that is 200 kHz or less higher, such as 10-50 kHz higher, for example 20 kHz higher than the drive frequency (e.g. 260 kHz for a 240 kHz drive frequency). Lock in measurement is performed at 20 kHz or 500 kHz, for example.

The probe 103 is then tested with a commercial AFM system (DI dimension 3100 system) equipped with a signal access module for external signal access and control. As shown in FIG. 7A, the standard DI probe holder is modified to facilitate the testing of the metallic piezoresistive probes. First, the electrical connections from the chip holder to the AFM headstage are disconnected. Second, four wires 31, 33, 35, 37 are soldered to the chip holder to enable an electrical connection to the piezo actuator 5 under the probe 103 and connections to two electrical contacts pads 39, 41 on the self-sensing probe. The term self-sensing means that the probe does not require external optics, such as a laser and photodetector to measure its mechanical response. The drive signal is applied to piezo actuator 5 through the AC drive source, such as an external function generator, 107 (Stanford Research System DS345). A bias voltage is supplied across the two legs 7 of the cantilever 1. A resistor 111 with a resistance value similar to that of the cantilever is used as a balance resistor (20.3 Ohms) for extraction of resonant AC signal. The voltage change across the probe 103 is further amplified through a low-noise voltage amplifier 119 (Stanford Research System SR560). This oscillating AC voltage is then fed into a lock-in amplifier 109 (Stanford Research System SR830). The measurement is locked into the drive signal provided by the function generator. x-output of the lock-in amplifier is supplied to one input channel of the nanoscope controller through signal access module after the phase extender box.

Figure 8:
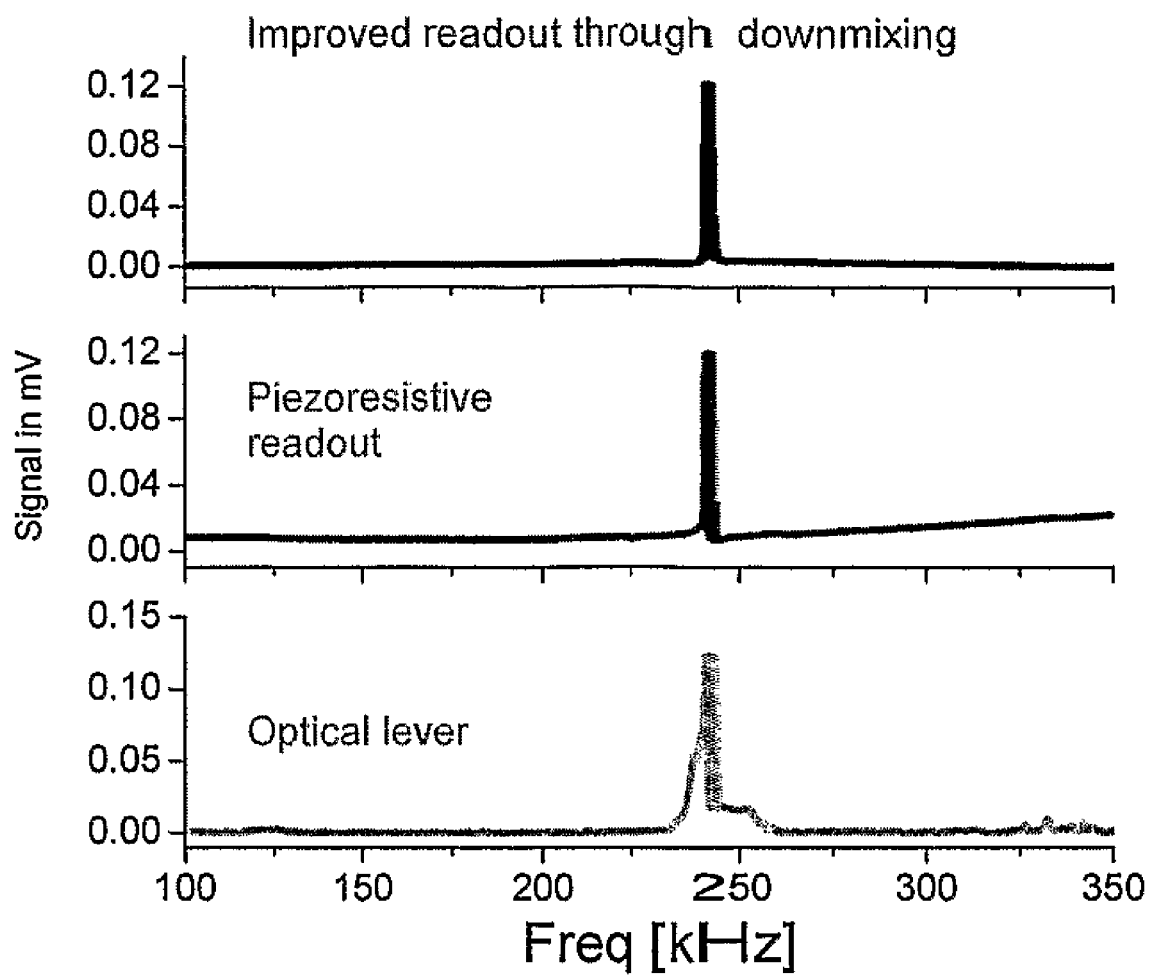

Resonant curves from electrical measurement are first obtained. FIG. 8 shows three resonant curves from the same cantilever. Trace 1 (bottom curve) is the result from AFM built-in laser deflection measurement. Trace 2 (middle curve) is a direct electrical lock-in measurement of the cantilever with DC bias current across the piezoresistive element. Trace 3 (upper curve) is an improved measurement result with AC bias current across the piezoresistive element (downmixing scheme described above). Comparable signal strengths are observed in all three curves. In optical data, side bands due to non-flexural resonance are apparent. They are absent in the electrical measurement curves. Apparently electrical measurements are immune to the shear motion displayed in the optical measurement data. A comparison between trace 2 and trace 3 shows that the downmixing scheme can effectively eliminate the cross-talk signal that is usually inevitable in such a measurement.

Figure 9:
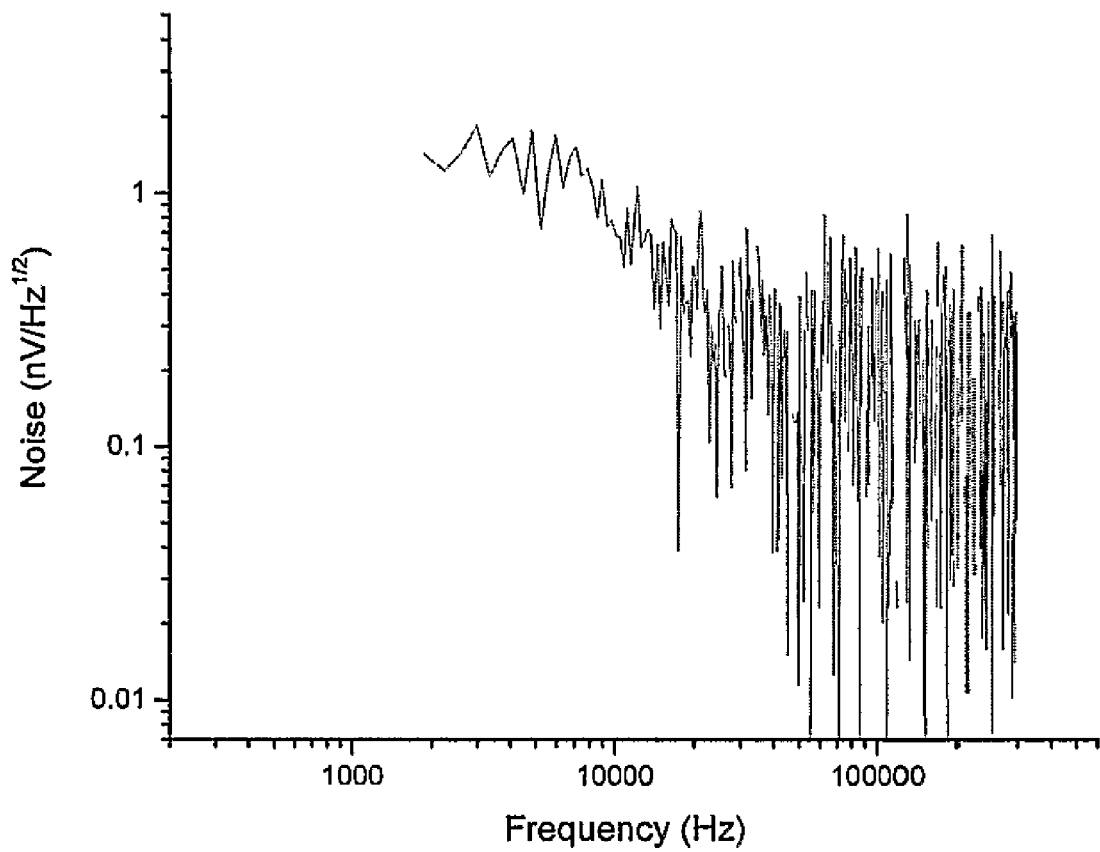
FIG. 9 is a plot of a noise spectrum from a metallic thin film piezoresistor.

The noise spectrum measurement is then performed on the metallic thin film containing probe, as shown in FIG. 9. Very low noise spectrum is observed. For frequency>1000 Hz, the noise level is below $1 nV/\sqrt{Hz}$, smaller than the Johnson noise generated by a 50 Ohm resistor at room temperature. Generally speaking, at the same frequency range, the noise level in p+ silicon is about $30 nV/\sqrt{Hz}$. The noise performance of metallic piezoresistor is at least about 30 times better than semiconducting Si material.

Figure 10A:
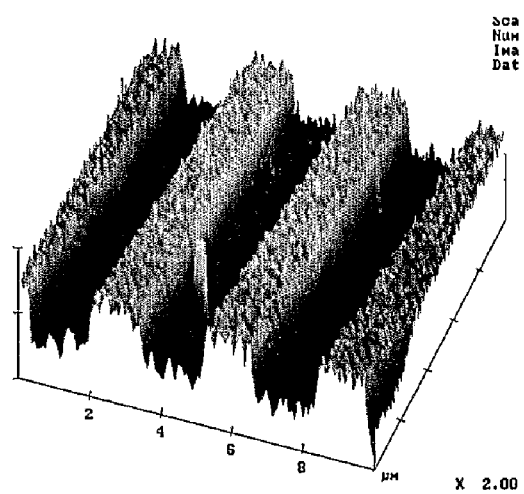
FIG. 10A is a 3D topographical image obtained from direct optical tapping mode AFM.
Figure 10B:
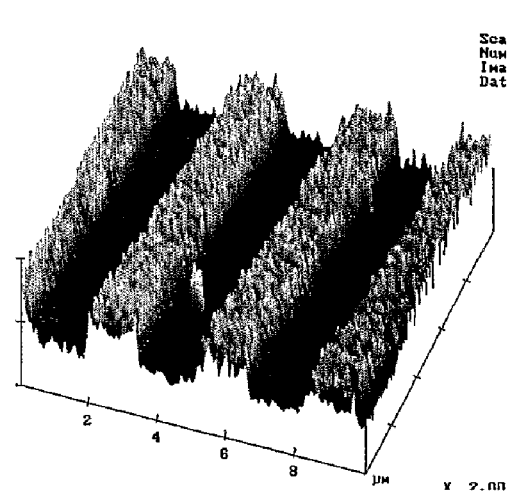
FIG. 10B is a 3D topographical image obtained from lock-in measurement of the metallic thin film piezoresistor.

A standard SPM calibration grating is employed to demonstrate the imaging capability of the exemplary metallic thin film containing probes. The grating is a 1-D array of rectangular $SiO_2$ steps on a silicon wafer with 3 micron pitch. The step height is 20 nm±1 nm. The topographic image shown in FIG. 10B is acquired from monitoring the output of the lock-in amplifier when AFM is operated at "lift mode". Optical tapping mode AFM image is shown in FIG. 10A for comparison. Even without signal conditioning, the metallic thin-film piezoresistor yields very high signal to noise ratio. The image quality is comparable to that of the optical measurement result. Thus, the SPM, such as the AFM is used to either determine and/or image characteristics of a surface being examined by the AFM probe 103 based on the piezoresistive response of the metal film 9. In other words, the AFM probe may be used to image a surface of a material as shown in FIG. 10B or to determine one or more characteristics of the surface of a material, as may be carried out with an AFM. Furthermore, while not shown in the Figures, a data processing device, such as a computer or a dedicated processor, is used to process the signal from the AFM probe and the associated equipment, such as the lock-in amplifier, to create, store and/or display the image and/or data corresponding to the surface characteristics. A metal film has been described above as the preferred piezoresistive film. However, other piezoresistive material films may also be used instead. For example, piezoresistive semiconductor films, such as doped silicon films, for example p-type doped silicon films, may be formed on resonator surfaces and used to detect movement of the resonator.

In all aspects and examples of the first embodiment of the invention, microelectromechanical and nanoelectromechanical systems include devices with features having a size of 1 micron to 100 microns and 1 nanometer to less than 1 micron, respectively, in at least one dimension, and preferably in two or three dimensions. Preferably, these features comprise movable features or elements, such as cantilevers, diaphragms, clamped beams, wires, etc. Microelectromechanical and nanoelectromechanical systems include, but are not limited to, scanning probe microscopes ("SPM"), such as atomic force microscopes ("AFM"), force and pressure sensors, flow sensors, chemical and biological sensors, and inertial sensors, such as accelerometers and motion transducers, mass sensors, charge sensors, and a biological imaging devices. For example, chemical and biological sensors may comprise one or more cantilevers having a surface coated with a material which selectively binds to a chemical or biological analyte (i.e., gas or liquid analyte containing or consisting of the chemical or biological species of interest).

The term "film" includes relatively thin metal films, having a thickness of about 100 nm to about 10 microns, thin metal films, having a thickness of about 10 nm to about 100 nm, and ultra thin metal films, such as discontinuous or island type metal films having a thickness of less than about 10 nm, as will be discussed in more detail below. The term "metal" includes pure or essentially pure metals and metal alloys.

The resonators may be made of any suitable material, such as inorganic materials, including semiconductor materials, such as Si, SiC, III-V and II-VI materials, insulating materials, such as metal or semiconductor oxides, nitrides or carbides, including SiN and $SiO_2$, glass and even organic materials, such as polymeric/plastic materials.

Metal piezoresistive element may comprise pure or essentially metals including, but not limited to, Au, Ag, Ni, Pt, Al, Cr, Pd, W, and metal alloys such as Constantan, Karma, Isoelastic, Nichrome V, Pt—W, Pt—Cr, etc. Semiconductor piezoresistive elements may comprise doped silicon, AlGaAs or other suitable semiconductor materials.

The resonator preferably comprises a micron or nanometer sized cantilever. However, it should be understood that the invention can be used with other resonators, including, but not limited to, doubly clamped beams, torsional resonators, and diaphragm resonators. Non-limiting examples of doubly clamped beam resonators, torsional resonators and diaphragm resonators are disclosed in U.S. patent application Ser. No. 10/826,007, U.S. Pat. No. 6,593,731 and PCT Application PCT/US03/14566 (published as WO/2004/041998) and its counterpart U.S. patent application Ser. No. 10/502,641, all incorporated herein by reference in their entirety. For example, a doubly clamped beam resonator comprises a beam that is fixed on both ends, but whose middle portion is free hanging so that it can flex or move perpendicular to its length. A torsional resonator may comprise, in a non-limiting example, a flexible diamond or polygonal shaped structure mounted at two anchor points and which can move by twisting or turning about an axis between the anchor points, as described and illustrated in U.S. Pat. No. 6,593,731. A diaphragm resonator may comprise any plate shaped resonator which is anchored at one or more edges and whose middle portion is free hanging so that it can move or flex in one or more directions. An example of a diaphragm resonator is a trampoline resonator.

2. Second Embodiment

In a second embodiment of the invention, a method of making nanoscale scanning probes is described. It should be noted that the method of the second embodiment may be used to make the resonator of the first embodiment. However, the resonator of the first embodiment may also be made by any other suitable method. Furthermore, the method of the second embodiment may be used to make a probe that is not used in the system and method of the first embodiment. Still further, while a cantilever shaped scanning probe is described, other resonators and sensor/imaging devices described above with respect to the first embodiment can be made instead.

Preferably, the probes of the second embodiment are used in NEMS adapted for scanning probe microscopy of biological samples. These probes preferably, but not necessarily fall into nanoscale size regime described above. For example, the thickness of the cantilever can be as thin as 30 nm, such as 30 nm to 150 nm. The width of the cantilevers is as narrow as 400 nm, such as 400 to 800 nm. These dimensions match the size of the scanned cells themselves and offer high resolution in scanning probe microscopes (SPM). Meanwhile, the small dimensions of the cantilevers allow them to be operated at much higher frequencies and yield faster temporal responses, namely as fast as 1 μs.

The mass fabrication process of the second embodiment employs a wafer scale nanofabrication technique that is capable of producing tens to hundreds of cantilevers from a single silicon wafer. The silicon chips that house the cantilevers may be chosen to match the size of the chips used in the SPM market so that conventional installation techniques are used. The semiconductor chips, such as silicon chips, also have electronic circuits integrated into them so that they can interface directly into the commercial scanning probe microscopes and provide a force-sensitive electrical signal.

Two types of mechanical motion detection schemes are disclosed below for nanoscale cantilevers: piezoresistive detection and optical detection. The former relies on the high piezoresistivity of a piezoresistive film, such as an epitaxially grown doped semiconductor layer, for example a p+ silicon layer, or a metal layer formed on or in the cantilever. Optical transduction is realized by focusing a radiation beam, such as a laser beam onto the end of the cantilever with a micron-scale reflecting pad which is disposed near the tip of cantilever, whereby the cantilever deflection is amplified by the optical path traveled from the tip of the cantilever to a split photo detector.

Figure 11:
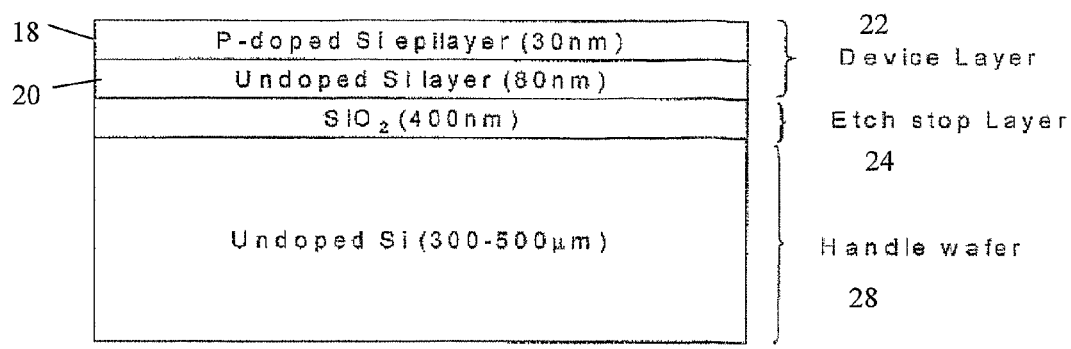
FIGS. 11 and 12A-12F show steps in the manufacture of a device of the second embodiment of the invention.

The starting material used for wafer scale fabrication can be divided into three sections as diagrammatically depicted in FIG. 11. The first section is the substrate 28, such as a handle wafer, which may be a thick (300-500 μm) Si wafer or another semiconductor substrate which will be used to mechanically support the cantilever. Handle wafer 28 in one embodiment is oriented in the [100] direction. This maximizes the piezoresistive constant along the [110] direction and eases the difficulty of fabrication and alignment of scanning probes fabricated from the structure.

The second section is the etch stop layer 24. An etch stop layer may comprise any material which exhibits a higher resistance to a given liquid or gas etching medium than the substrate 28, such that when the substrate 28 is etched, the etch will terminate on the etch stop layer 24. For example, the etch stop layer 24 may be a thin (400 nm to 1 μm) layer of silicon oxide (i.e. $SiO_2$), silicon nitride or another insulating material.

The third section is the device layer section 22. For piezoresistive detection, the device layer section 22 comprises the cantilever material 20 and the piezoresistive film 18. The cantilever material 20 may be a layer of a semiconductor material, such as undoped silicon, a compound semiconductor material or metal or semiconductor oxide, nitride or carbide, such as $SiO_2$, $Si_3N_4$, SiC, etc. For example, layer 20 may comprise a 60-100 nm, such as 80 nm undoped silicon layer.

The piezoresistive film 18 may comprise a metal or doped semiconductor film, such as a 30-50 nm, for example a 30 nm p-doped (boron doped) Si layer ($4\times10^{19}$ $cm^{-2}$). Layer 18 may be grown epitaxially on layer 20, by MBE, CVD, etc. Alternatively, a polysilicon bilayer 18/20 may be used instead. The bilayer can be made by plasma enhanced chemical vapor deposition (PECVD) with in-situ or subsequent doping.

For optical detection, the device section 22 may comprise any suitable layer which can be formed into a functional cantilever. Materials such as Si, SiC, SiN, or metal (i.e. Au, Al, Pt, etc.) can be used. If the material is transparent (SiC or SiN) to the laser's emission used for the optical transduction, a small (1 μm×1 μm to 10 μm×10 μm wide, 30 mn thick) Au pad shown in FIG. 14 can be fabricated at the end of the cantilever to maximize reflectivity of the cantilever.

Figure 12A:
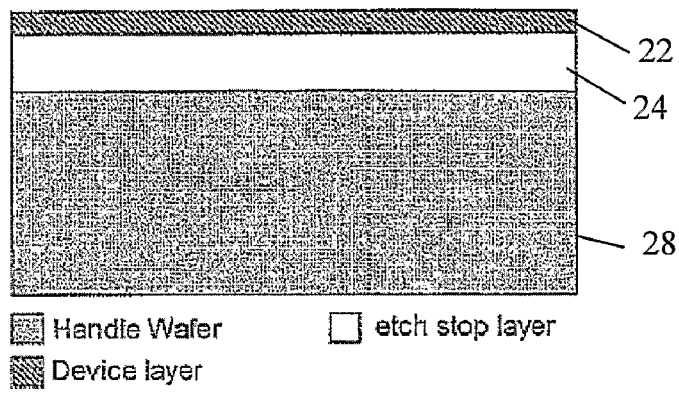

The process flow for the fabrication of wafer scale piezoresistive cantilevers 10 is diagrammatically depicted in FIGS. 12A-12F. FIG. 12A is a side cross-sectional view of the starting material shown in FIG. 11.

Figure 12B:
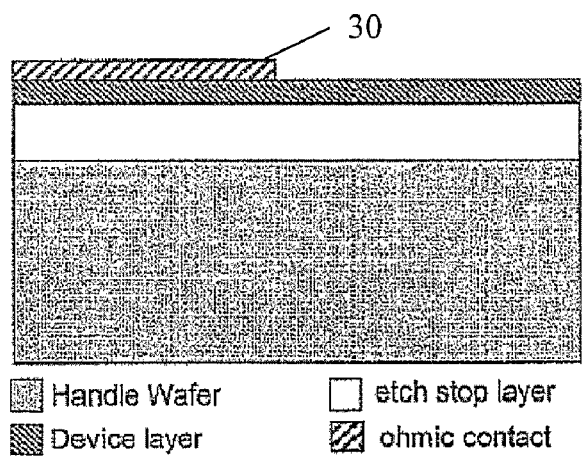

Then, the electrodes 30 for the cantilevers are formed on the device layer section 22, as shown in FIG. 12B. The electrodes 30 may be formed by depositing a metal or polysilicon layer and then photolithographically patterning it into a desired shape. The electrodes 30 comprise ohmic contacts for the cantilever.

Figure 12C:
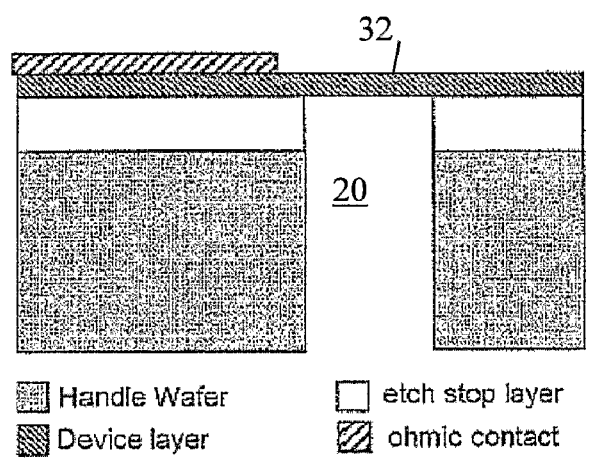

After forming the electrodes 30, membranes 32 are formed, as shown in FIG. 12C. The membranes 32 are formed by masking the bottom of the substrate 28, etching the substrate until the etch stop layer 24 is reached, and then etching the etch stop layer with a different etching medium to stop on the device layer 22. For example, the substrate 28 may be etched using deep reactive ion etching (DRIE) or other dry etching methods and the etch stop layer 24 may be etched using wet etching, such as a buffered oxide wet etch. An opening 20 is located under the membrane 32.

Figure 13:
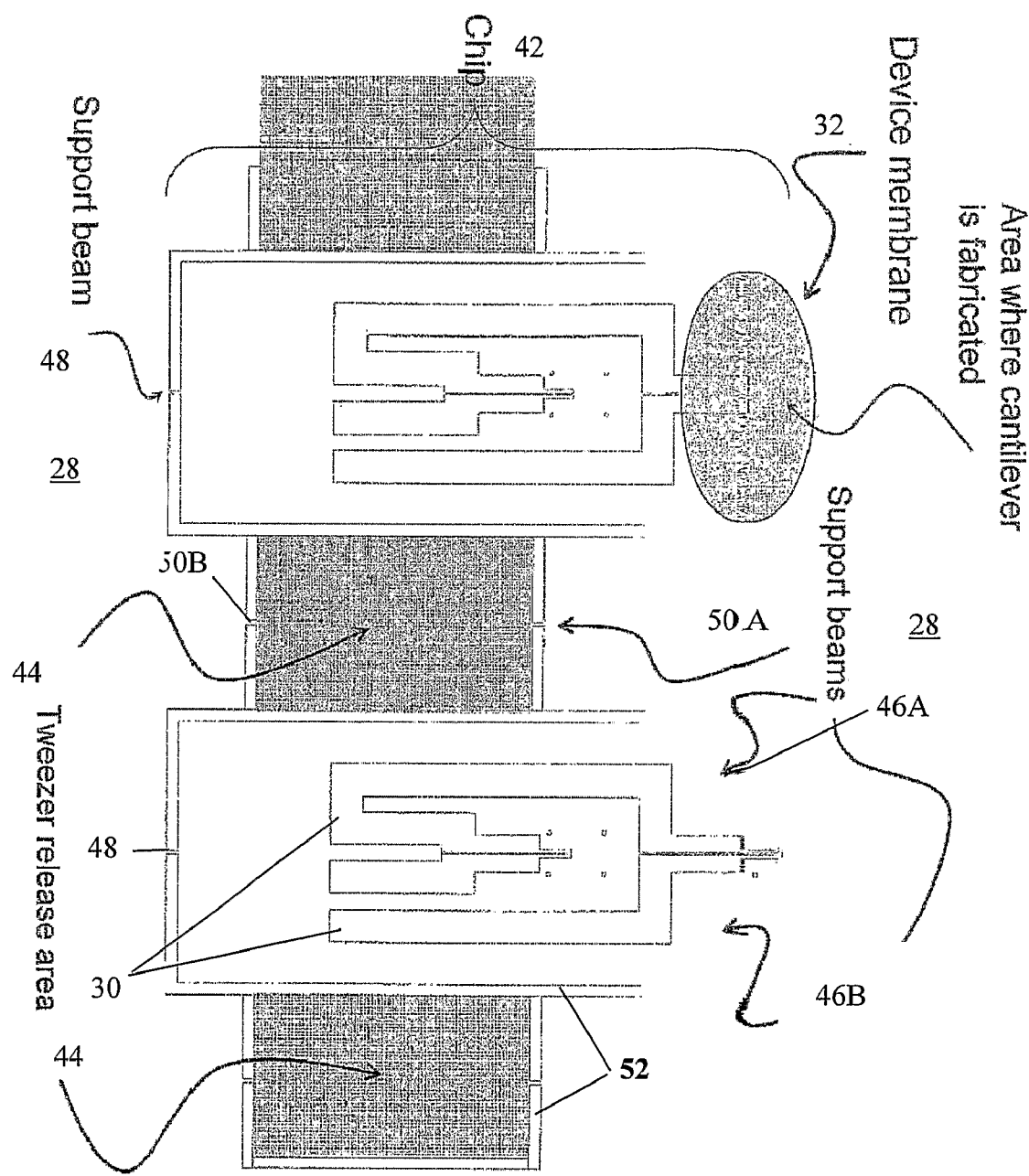
FIG. 13 is a top view of an in-process device of the second embodiment of the invention.

Preferably, the support beams 46A, 46B and 48 shown in FIG. 13 are fabricated in the same step depicted in FIG. 12C by etching the substrate 28 and etch stop layer 24 to create the support beams at the same time as the membranes 32. The support beams 46A, 46B and 48 temporarily connect the probe chip 42 to the remainder of the wafer 28 as shown in FIG. 13. Support beams 46A, 46B and 48 bridge the thin membrane 32 from the wafer 28 and provide a full thickness element to provide mechanical connection strong enough to withstand normal wafer process handling. However, supports 46A, 46B and 48 are not so large that they cannot be easily broken when desired by manual or robotic tweezer manipulation.

Figure 12D:
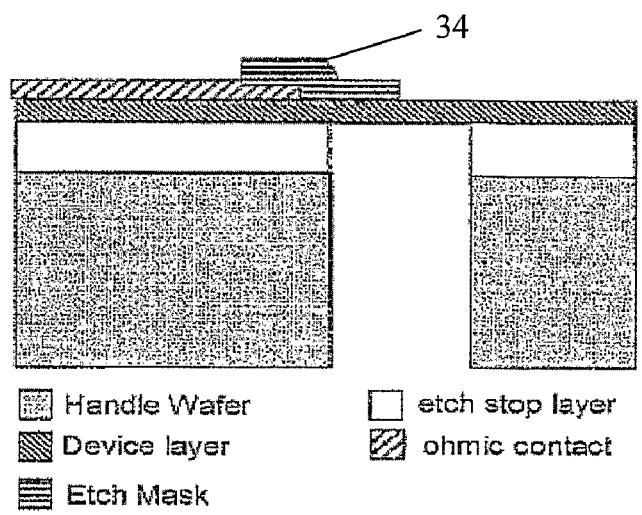

In the step shown in FIG. 12D, a cantilever etch mask 34 is photolithographically defined over each membrane 32. The mask extends in part over wafer 28/electrodes 30 partially and over the membranes 32.

Figure 12E:
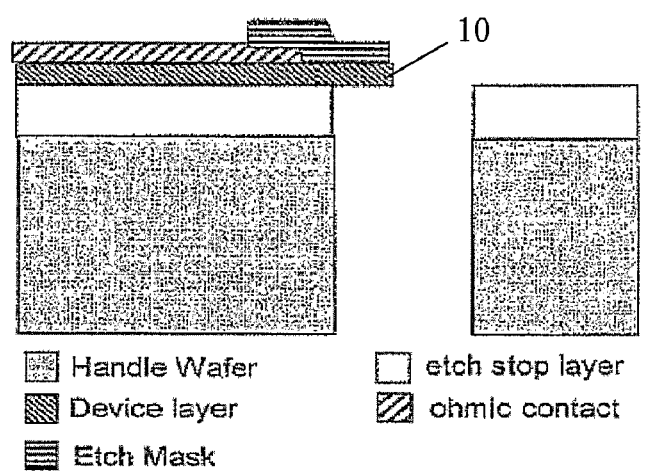
Figure 12F:
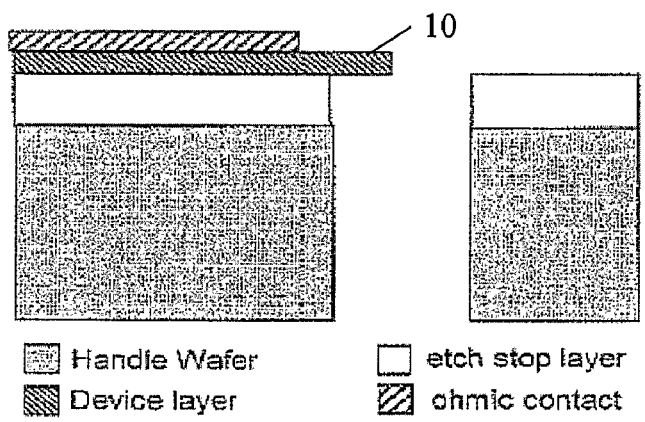

The cantilevers 10 are then defined using the etch mask 34 as shown in FIG. 12E. For example, the exposed portions of the membranes may be etched away using any suitable etching method, such as electron beam patterning, for example. Cantilever fabrication is completed with the removal of etch mask 34 as depicted in FIG. 12F.

Figure 14:
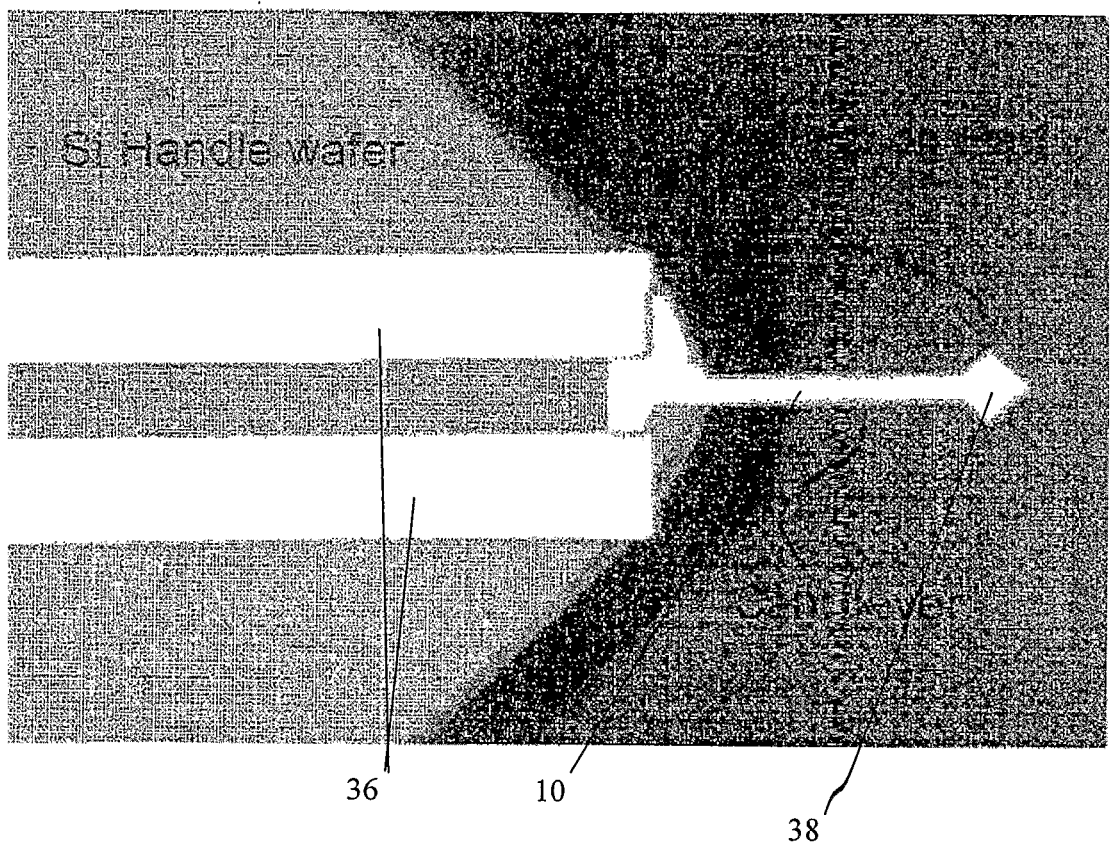
FIG. 14 is a micrograph of an SPM probe of the second embodiment of the invention.

FIG. 14 is a top plan view of a micrograph of the SPM probe. For piezoresistive detection, the piezoresistive film is preferably positioned on legs 36 of the cantilever, as shown in FIG. 14 and in FIGS. 5A and 5B of the first embodiment. Laying out a scanning probe using cantilever 10 with electrode legs forms a stress concentration region where the current passes through the most compliant area of the probe and serves to maximize the piezoresistive response with actuation.

For optical detection, the scanning probe is designed to include at least approximately a 1 $μm^2$ reflective pad 38 near the tip of cantilever 10 as illustrated in FIG. 14, in which case legs 36 do not need to contain the piezoresistive film. A metal pad, such as a 20 nm thick pad 38 of Au, is evaporated or sputtered onto the selected area near the probe tip. This reflective area 38 allows diffraction limited optical feedback to be utilized in commercial scanning probe microscope.

The fabricated structure with temporary support and release features is shown in the top plan diagrammatic view of FIG. 13. FIG. 13 shows electrodes 30 deployed on device layer section 22 and cantilevers 10 in the chips 42. The device in FIG. 13 is adapted for piezoresistive detection and pairs of electrodes 30 provide electrical paths for leads. For example, one chip 42 may contain two cantilevers, with one cantilever being the sensing cantilever and the other cantilever being a dummy cantilever. Movement of the cantilevers may be detected using the circuits of FIG. 1A or 1B, for example. Other suitable circuits may also be used.

FIG. 13 shows two release areas 44 adjacent to the chips 42. The release areas enable removal of each chip or chips 42 from the wafer by any suitable means, such as manual or robotic tweezers or other removal tools. Thus, the chips 42 may be separated from the substrate 28 without dicing the substrate 28.

FIG. 13 also shows three support beams 46A, 46B and 48 which support each chip 42 on the substrate 28 prior to the removal of the chips from the substrate. However, two or more than three support beams may also be used. FIG. 13 shows two support beams near the tip of the chip and one beam in the back of the chip. However, the beams may be arranged at other suitable locations as well. Thus, the number and location of the support beams shown in FIG. 13 is exemplary and should not be considered limiting.

As shown in FIG. 13, two support beams 46A and 46B are located near the tip of chip 42. These beams support and protect membrane 32 from tearing prior to defining the scanning probe cantilever 1O. Membrane 32 is the portion of device layer section 22 which is left unsupported when the underlying portions of the etch stop layer 24 and substrate 28 are removed. A third support beam 48 is also connected to the substrate 28 and is used to support rear end of chip 42. Additional support beams 50A and 50B may be used to connect and support the release areas 44 to the substrate 28. The support beams axe strong enough to withstand the stresses and handling of subsequent wafer-scale processing of the chips while remaining compliant enough to be broken to allow chip removal from substrate 28. In the illustrated embodiment, the support beams have the dimensions of 25×70×0.1 microns, but other dimensions could be employed as long as the functional requirements of support are satisfied.

In one aspect of the second embodiment, each chip 42 and release area 44 is surrounded by a thin peripheral membrane 52. The peripheral membrane may be formed during the same step as the device membrane 32, as shown in FIG. 12C. The peripheral membrane 52 may comprise the same material as the device membrane 32 (i.e., the device layer 22) and may have the same thickness as the device layer 22, such as 500 nm or less, for example 80 to 200 nm. Thus, the thin peripheral membrane 52 also connects the chips 42 and release areas 44 to the substrate 28, but does not provide a sufficient amount of support to support the chips 42 on the substrate without the thicker support beams.

In another aspect of the second embodiment, the peripheral membrane 52 is omitted, and each chip 42 and release area 44 are surrounded by a gap instead of the peripheral membrane 52. In this aspect, each chip 42 and release area 44 are connected to the rest of the substrate 28 only by the support beams, and each chip 42 has an island-like structure which is structurally connected to the rest of the substrate 28 only by the support beams.

Thus, each chip 42 and release area 44 are surrounded either by a thin peripheral membrane 52 (which provides little if any mechanical support to chips 42) or by a gap. Release areas 44 can be manually or mechanically twisted or removed by tweezers or other instruments applied to release areas 44 to break support beams 50A and 50B. The peripheral membrane 52 surrounding release areas 44 is also torn, but almost all of the mechanical coupling of the release areas 44 to substrate 28 is provided by the support beams 50A and 50B.

With the release areas 44 removed, then it is an easy matter to similarly remove individual chips 42 from wafer 28 using tile access then provided for the tweezers or other instruments. In other words, the tweezers or other instruments may be inserted into the gaps where the release areas 44 where previously located to grasp the chips 42. The chip 42 removal from the substrate 28 may be achieved by manually or mechanically twisting or stressing supports 46A, 46B and 48 to break them. The peripheral membrane 52 surrounding each chip 42 is also torn apart, but again with little mechanical resistance due to its low thickness. Cantilever 10 which was etched from the device membrane 32 is sufficiently separated from the peripheral membrane 52 so that tearing or stress applied to the peripheral membrane 52 is well isolated and disconnected from cantilever 10. The completed device is now ready to be installed in a scanning probe microscope or other suitable sensor device described in the first embodiment in the conventional manner.

FIG. 15 shows a plot of power versus frequency for cantilevers 10 fabricated according to the second embodiment for optically detected signals at room temperature in a vacuum. FIG. 16 shows a plot of $S_v$ (i.e., power/frequency) versus frequency for cantilevers 10 fabricated according to the second embodiment for piezoresistively detected signals at a cryogenic temperature of 5°K. FIG. 15 shows a cantilever with a Q factor of 218 and a resonance peak at 27.3 kHz while FIG. 16 shows a cantilever with a Q factor of 13,231 and a resonance peak at about 620.22 kHz.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents. All articles, patents and patent applications mentioned herein are incorporated herein by reference in their entirety.

The invention claimed is:

1. A method of operating a micro-mechanical or nano-mechanical device comprising a resonator and a piezoresistive element connected to the resonator, the method comprising:

AC biasing the piezoresistive element at a first frequency;

driving the resonator at a second frequency different from the first frequency;

detecting a mechanical response of the resonator at one or both of a difference frequency and a sum frequency of the first and second frequencies; and AC biasing a resistor at the first frequency and detecting an output signal at a bridge point between the resistor and the micro-mechanical or nano-mechanical device.

2. The method of claim 1, wherein the step of detecting comprising determining an amount of mechanical displacement of the resonator.

3. The method of claim 1, wherein the step of driving the resonator comprises oscillating the resonator using an AC drive source at the second frequency, which comprises the resonator's resonant frequency.

4. The method of claim 1, wherein the second frequency comprises a resonance frequency of the resonator which is less than the first frequency.

5. The method of claim 4, wherein the step of detecting comprises detecting a mechanical response of the resonator at a difference of the first and second frequencies.

6. The method of claim 1, wherein the step of AC biasing comprises providing an AC biasing voltage across the piezoresistive element and the resistor at the first frequency and the step of detecting the output signal comprises detecting an output voltage which is a function of a frequency difference between the first and the second frequencies.

7. The method of claim 6, wherein the output voltage comprises $$V_{out}(t) \approx \frac{V_{b0}\cos(\omega_b t)}{4R}(\Delta R\cos(\omega_d t + \phi)) \approx$$

$$V_{b0}\frac{\Delta R}{8R}|\cos(\Delta\omega t - \phi) + \cos((2\omega_d + \Delta\omega)t + \phi)|,$$

where R is a resistance of the resistor, $\Delta R$ is a difference between a resistance of the resistor and a resistance of the piezoresistive element, $\Delta \omega$ is a difference between the first and the second frequencies, $V_{b0}$ is the AC biasing voltage, $\phi$ is an oscillation phase and t is time.

8. The method of claim 7, wherein the step of detecting comprises providing the output voltage into a phase sensitive detector.

9. The method of claim 8, further comprising mixing the AC biasing voltage and an AC drive voltage used to drive the resonator, and providing a mixed voltage into the phase sensitive detector, which comprises a lock-in amplifier, as a reference voltage.

10. The method of claim 1, wherein the device comprises an entire or a portion of a NEMS.

11. The method of claim 10, wherein the NEMS comprises at least one of a mass sensor, a charge sensor, a force sensor, a pressure sensor, a flow sensor, a chemical sensor, a biological sensor, an inertial sensor and a biological imaging device.

12. The method of claim 1, wherein the device comprises an entire or a portion of a MEMS.

13. The method of claim 1, wherein the device is located in an AFM system and the resonator comprises an AFM probe.

14. The method of claim 13, further comprising at least one of determining or imaging characteristics of a surface being examined by the AFM probe based on a piezoresistive response of the piezoresistive element.

15. The method of claim 1, wherein the piezoresistive element comprises a metal film.

16. The method of claim 1, wherein the piezoresistive element comprises a semiconductor film.

17. The method of claim 1, wherein the resonator comprises a cantilever.

18. The method of claim 1, wherein the resonator is selected from a group consisting of a torsional resonator, a doubly clamped beam and a diaphragm resonator.

19. A system, comprising:
a micro-mechanical or nano-mechanical device comprising resonator and a piezoresistive element connected to the resonator;
an AC bias source electrically connected to the piezoresistive element and adapted to AC bias the piezoresistive element at a first frequency;
an AC drive source operatively connected to the resonator and adapted to drive the resonator at a second frequency different from the first frequency;
a phase sensitive detector comprising a lock-in amplifier, the detector is electrically connected to the piezoresistive element and adapted to detect a mechanical response of the resonator at one or both of a difference frequency and a sum frequency of the first and second frequencies, and
a resistor,
wherein the AC drive source is a) electrically connected to a piezoactuator, which is adapted to oscillate the resonator the second frequency which comprises a resonant frequency of the resonator, and b) adapted to provide a first voltage having the first frequency to both the piezoresistive element and to the resistor.

20. The system of claim 19, wherein the step of detecting comprises detecting a mechanical response of the resonator at a difference of the first and second frequencies.

21. The system of claim 19, further comprising a first low pass filter whose output is electrically connected to an input of the lock-in amplifier and whose input is connected to a bridge point between the resistor and the micro-mechanical or nano-mechanical device.

22. The system of claim 21, further comprising a mixer whose first input is electrically connected to an output of the AC bias source, whose second input is electrically connected to an output of the AC drive source, and whose output is electrically connected via a second low pass filter to a reference input of the lock-in amplifier.

23. The system of claim 19, wherein the resonator is selected from a group consisting of a torsional resonator, a doubly clamped beam and a diaphragm resonator.

24. The system of claim 19, wherein the resonator comprises a cantilever.

25. The system of claim 24, wherein the cantilever comprises a notch and leg portions surrounding the notch, and the piezoresistive element comprises a piezoresistive film located at least on the leg portions of the cantilever.

26. The system of claim 25, wherein the cantilever comprises an inorganic material.

27. The system of claim 25, wherein the piezoresistive element comprises a metal film located on a surface of the resonator.

28. The system of claim 25, wherein the piezoresistive element comprises a semiconductor film located on a surface of the resonator.

29. The system of claim 25, wherein the device comprises an AFM probe containing an AFM tip on a first surface of the cantilever.

30. The system of claim 19, wherein the device comprises an entire or a part of a MEMS or NEMS selected from a group consisting of a SPM probe, a mass sensor, a charge sensor, a force sensor, a pressure sensor, a flow sensor, a chemical sensor, a biological sensor, an inertial sensor and a biological imaging device.

31. The system of claim 19, wherein the device is made by a method composing:
forming at least one release region adjacent to the device;

forming a membrane at least partially surrounding the device;

forming a plurality of support beams connecting the device to a substrate;

removing the at least one release region to form at least one gap adjacent to the device;

using the at least one gap region to remove the device from the substrate by breaking the plurality of support beams and the membrane.

32. The system of claim 31, wherein the method further comprises patterning a portion of the membrane to form a cantilever after forming the support beams but prior to removing the at least one release region.

33. A method of operating a micro-mechanical or nano-mechanical device comprising a resonator and a piezoresistive element connected to the resonator, the method comprising:

AC biasing the piezoresistive element at a first frequency;

driving the resonator at a second frequency different from the first frequency; and detecting a mechanicresponse of the resonator at one or both of a difference frequency and a sum frequency of the first and second frequencies, wherein the device comprises an entire or a portion of a NEMS.

34. The method of claim 33, wherein the step of detecting comprising determining an amount of mechanicdisplacement of the resonator.

35. The method of claim 33, wherein the step of driving the resonator comprises oscillating the resonator using an AC drive source at the second frequency, which comprises the resonator's resonant frequency.

36. The method of claim 33, wherein the second frequency comprises a resonance frequency of the resonator which is less than the first frequency.

37. The method of claim 36, wherein the step of detecting comprises detecting a mechanical response of the resonator at a difference of the first and second frequencies.

38. The method of claim 33, wherein the NEMS comprises at least one of a mass sensor, a charge sensor, a force sensor, a pressure sensor, a flow sensor, a chemical sensor, a biological sensor, an inertial sensor and a biological imaging device.

39. The method of claim 38, further comprising mixing the AC biasing voltage and an AC drive voltage used to drive the resonator, and providing a mixed voltage into the phase sensitive detector, which comprises a lock-in amplifier, as a reference voltage.

40. The method of claim 39, wherein the step of detecting comprises providing the output voltage into a phase sensitive detector.

41. The method of claim 40, wherein the output voltage comprises $$V_{out}(t) \approx \frac{V_{b0}\cos(\omega_d t)}{4R}(\Delta R\cos(\omega_d t + \phi))$$
$$\approx V_{b0}\frac{\Delta R}{8R}[\cos(\Delta\omega t - \phi) + \cos((2\omega_d + \Delta\omega)t + \phi)],$$

where R is a resistance of the resistor, $\Delta R$ is a difference between a resistance of the resistor and a resistance of the piezoresistive element, $\Delta\omega$ is a difference between the first and the second frequencies, $V_{b0}$ is the AC biasing voltage, $\phi$ is an oscillation phase and t is time.

42. The method of claim 33, wherein the device is located in an AFM system and the resonator comprises an AFM probe.

43. The method of claim 42, further comprising at least one of determining or imaging characteristics of a surface being examined the AFM probe based on a piezoresistive response of the piezoresistive element.

44. The method of claim 33, wherein the piezoresistive element comprises a metal film.

45. The method of claim 33, wherein the piezoresistive element comprises a semiconductor film.

46. The method of claim 33, wherein the resonator comprises a cantilever.

47. The method of claim 33, wherein the resonator is selected from a group consisting of a torsional resonator, a doubly clamped beam and a diaphragm resonator.

48. A system, comprising:

a micro-mechanical or nano-mechanical device comprising resonator and a piezoresistive element connected to the resonator;

an AC bias source electrically connected to the piezoresistive element and adapted to AC bias the piezoresistive element at a first frequency;

an AC drive source operatively connected to the resonator and adapted to drive the resonator at a second frequency different from the first frequency; and a phase sensitive detector electrically connected to the piezoresistive element and adapted to detect a mechanicresponse of the resonator, wherein the device comprises an entire or a part of a MEMS or NEMS selected from a group consisting of a SPM probe, a mass sensor, a charge sensor, a force sensor, a pressure sensor, a flow sensor, a chemical sensor, a biological sensor, an inertial sensor and a biological imaging device.

49. The system of claim 48, wherein the detector is adapted to detect a mechanical response of the resonator at one or both of a difference frequency and a sum frequency of the first and second frequencies.

50. The system of claim 49, wherein the step of detecting comprises detecting a mechanical response of the resonator at a difference of the first and second frequencies.

51. The system of claim 49, wherein the AC drive source is electrically connected to a piezoactuator which is adapted to oscillate the resonator the second frequency which comprises a resonant frequency of the resonator.

52. The system of claim 51, wherein the detector comprises a lock-in amplifier.

53. The system of claim 52, further comprising a resistor, wherein the AC bias source is adapted to provide a first voltage having the first frequency to both the piezoresistive element and to the resistor and a first low pass filter whose output is electrically connected to an input of the lock-in amplifier and whose input is connected to a bridge point between the resistor and the micro-mechanical or nano-mechanical device.

54. The system of claim 53, further comprising a mixer whose first input is electrically connected to an output of the AC bias source, whose second input is electrically connected to an output of the AC drive source, and whose output is electrically connected via a second low pass filter to a reference input of the lock-in amplifier.

55. The system of claim 48, wherein the resonator is selected from a group consisting of a torsional resonator, a doubly clamped beam and a diaphragm resonator.

56. The system of claim 48, wherein the resonator comprises a cantilever.

57. The system of claim 56, wherein the cantilever comprises a notch and leg portions surrounding the notch, and the piezoresistive element comprises a piezoresistive film located at least on the leg portions of the cantilever.

58. The system of claim 56, wherein the cantilever comprises an inorganic material.

59. The system of claim 56, wherein the piezoresistive element comprises a metal film located on a surface of the resonator.

60. The system of claim 56, wherein the piezoresistive element comprises a semiconductor film located on a surface of the resonator.

61. The system of claim 56, wherein the device comprises an AFM pre containing an AFM tip on a first surface of the cantilever.

* * * * *